(12) United States Patent
Langh

(10) Patent No.: US 10,005,020 B2
(45) Date of Patent: Jun. 26, 2018

(54) METHOD FOR TREATING IMPURITIES CONTAINED IN EXHAUST GASES OF SHIPS, SHIP WITH A SCRUBBER, AND PURIFICATION UNIT

(71) Applicant: OY LANGH TECH AB, Piikkiö (FI)

(72) Inventor: Hans Langh, Piikkio (FI)

(73) Assignee: OY LANGH TECH AB, Piikkio (FI)

( * ) Notice: Subject to any disclaimer, the term of this patent is extended or adjusted under 35 U.S.C. 154(b) by 869 days.

(21) Appl. No.: 14/368,441

(22) PCT Filed: May 8, 2013

(86) PCT No.: PCT/FI2013/050511
§ 371 (c)(1),
(2) Date: Jun. 24, 2014

(87) PCT Pub. No.: WO2014/181029
PCT Pub. Date: Nov. 13, 2014

(65) Prior Publication Data
US 2015/0182905 A1    Jul. 2, 2015

(51) Int. Cl.
*B01D 46/00*    (2006.01)
*B01D 53/14*    (2006.01)
(Continued)

(52) U.S. Cl.
CPC ..... *B01D 53/1425* (2013.01); *B01D 53/1412* (2013.01); *B01D 53/1418* (2013.01);
(Continued)

(58) Field of Classification Search
None
See application file for complete search history.

(56) References Cited

U.S. PATENT DOCUMENTS 4,147,635 A * 4/1979 Crowe ................. B01D 29/096
210/401
4,507,208 A    3/1985 Simon et al.
(Continued)

FOREIGN PATENT DOCUMENTS

CN    102006918    4/2011
CN    102348487    2/2012
(Continued)

OTHER PUBLICATIONS

Future filtration. Filtration of scrubber water. LiqTech International, accessed Aug. 30, 2017.*
(Continued)

*Primary Examiner* — Christopher P Jones
*Assistant Examiner* — Phillip Y Shao
(74) *Attorney, Agent, or Firm* — Young & Thompson

(57) ABSTRACT

A method for treating impurities contained in exhaust gases of ships to reduce sulphur oxide and other emissions, includes scrubbing the exhaust gases in an exhaust gas scrubber and supplying wash water effluent exiting from the scrubber and containing impurities to a purification unit onboard a ship. In order for the method to purify wash water exiting the scrubber sufficiently enough to be discharged directly to sea, the purification unit includes a moving filter band, whereby an aqueous fluid containing impurities originating from the effluent is together with a precipitating agent fed to a surface of the inclined filter band and filtered there through to concentrate impurities onto the surface of the band filter as a precipitate. When necessary, the pH of the purified effluent is adjusted so that it is at least 6.5 before discharging the purified effluent into the sea or returning it to the exhaust gas scrubber.

17 Claims, 6 Drawing Sheets

(51) Int. Cl.
*C02F 1/52* (2006.01)
*F01N 3/04* (2006.01)
*B01D 65/02* (2006.01)
*C02F 1/44* (2006.01)
*C02F 9/00* (2006.01)
*B63H 21/00* (2006.01)
*F01N 3/18* (2006.01)
*C02F 1/66* (2006.01)
*C02F 11/12* (2006.01)
*B01D 61/02* (2006.01)
*B01D 61/14* (2006.01)
*C02F 101/10* (2006.01)
*C02F 103/18* (2006.01)
*C02F 103/00* (2006.01)

(52) U.S. Cl.
CPC ..... *B01D 53/1456* (2013.01); *B01D 53/1481* (2013.01); *B01D 65/02* (2013.01); *B63H 21/00* (2013.01); *C02F 1/44* (2013.01); *C02F 1/52* (2013.01); *C02F 9/00* (2013.01); *F01N 3/04* (2013.01); *F01N 3/18* (2013.01); *B01D 61/025* (2013.01); *B01D 61/027* (2013.01); *B01D 61/145* (2013.01); *B01D 61/147* (2013.01); *B01D 2252/103* (2013.01); *B01D 2252/1035* (2013.01); *B01D 2258/012* (2013.01); *B01D 2259/4566* (2013.01); *B01D 2321/04* (2013.01); *C02F 1/66* (2013.01); *C02F 11/12* (2013.01); *C02F 2101/101* (2013.01); *C02F 2103/008* (2013.01); *C02F 2103/18* (2013.01); *C02F 2201/008* (2013.01); *C02F 2209/06* (2013.01); *F01N 2570/04* (2013.01); *F01N 2590/02* (2013.01); *Y02A 50/2348* (2018.01); *Y02T 10/20* (2013.01)

(56) References Cited

U.S. PATENT DOCUMENTS

| | | | | |
|---|---|---|---|---|
| 4,627,970 A | * | 12/1986 | Kruger | B01D 53/501 210/777 |
| 5,244,579 A | * | 9/1993 | Horner | B01D 61/022 210/195.2 |
| 5,800,701 A | * | 9/1998 | Larsen | B01D 33/333 210/107 |
| 6,066,255 A | * | 5/2000 | Anderson | B01D 33/04 210/297 |
| 6,183,646 B1 | * | 2/2001 | Williams | A61L 2/16 210/199 |
| 6,280,612 B1 | * | 8/2001 | Kroos | B01D 33/04 210/158 |
| 6,810,662 B2 | | 11/2004 | Sundholm | |
| 8,652,331 B2 | * | 2/2014 | Zha | B01D 65/02 210/108 |
| 2007/0014712 A1 | * | 1/2007 | Pehkohen | B01D 53/502 423/244.07 |
| 2008/0197075 A1 | | 8/2008 | Musale et al. | |
| 2010/0206171 A1 | | 8/2010 | Peng | |
| 2010/0224070 A1 | * | 9/2010 | Patterson | B01D 53/1425 96/181 |
| 2011/0139693 A1 | * | 6/2011 | Frankenberger | E02B 8/026 210/160 |
| 2011/0139715 A1 | * | 6/2011 | Zha | B01D 65/02 210/636 |
| 2011/0262331 A1 | | 10/2011 | Ukai et al. | |
| 2012/0312166 A1 | | 12/2012 | Theis et al. | |
| 2014/0374337 A1 | * | 12/2014 | Frankenberger | B01D 33/048 210/396 |

FOREIGN PATENT DOCUMENTS

| | | | |
|---|---|---|---|
| EP | 1857169 A1 | 11/2007 | |
| EP | 2340886 A1 | 7/2011 | |
| GB | 2288342 A | 10/1995 | |
| WO | WO 02055182 A9 * | 4/2004 | ......... B01D 61/025 |
| WO | 2005023397 A1 | 3/2005 | |

OTHER PUBLICATIONS

Chinese Office Action dated Oct. 10, 2016; Application No. 201380026321.2.

International Search Report, dated Feb. 25, 2014, from corresponding PCT application.

Extended European Search Report for European Application No. 13869850, dated Jun. 1, 2016.

* cited by examiner

METHOD FOR TREATING IMPURITIES CONTAINED IN EXHAUST GASES OF SHIPS, SHIP WITH A SCRUBBER, AND PURIFICATION UNIT

BACKGROUND OF THE INVENTION

The invention relates to a method for treating impurities contained in exhaust gases of ships, the method comprising
- scrubbing with water the exhaust gases in an exhaust gas scrubber in order to reduce sulphur dioxide emissions of the exhaust gases,
- supplying wash water to be purified, containing impurities and exiting from the exhaust gas scrubber, to a purification unit onboard a ship, in which effluent is purified, and
- monitoring a pH value of the purified effluent, and if it is less than 6.5, the pH value of the effluent is adjusted to a value of at least 6.5, after which the purified effluent is discharged into a sea or returned to the exhaust gas scrubber.

The invention also relates to a ship comprising an exhaust gas scrubber for purifying exhaust gases from the ship's combustion engine and for reducing sulphur dioxide emissions, and a purification unit for purifying wash water to be purified and exiting from the exhaust gas scrubber.

The invention further relates to a purification unit for purifying polluted wash water, i.e. effluent, exiting from an exhaust gas scrubber of a ship.

From US 2010224070 A1 a method of aforesaid kind and a ship of the above type are known.

It is widely known to clean exhaust gases from ships' engines by means of exhaust gas scrubbers. The purpose is to reduce sulphur dioxide emissions of the exhaust gases in particular since they are problematic to the environment. Sulphur dioxide emissions occur because engines of a ship use a sulphur-containing fuel, which oxidizes during fuel combustion process in the engine. Low sulphur fuels enable sulphur dioxide emissions to be reduced but the low sulphur fuels are expensive. In order to be able to use fuels whose sulphur content can be relatively high, i.e. higher than that in so-called low sulphur fuels, exhaust gases are scrubbed in exhaust gas scrubbers, enabling sulphur dioxide emissions to be dramatically reduced as compared with not scrubbing the exhaust gases. An exhaust gas scrubbing process produces wash water which contains impurities and which as such cannot be discharged into the sea since the wash water contains a large amount of impurities and, typically, the pH value of the wash water is also too low for it to be allowed to be discharged into the sea. Wash water exiting from the exhaust gas scrubber may be fed back to the exhaust gas scrubber, but the wash water cannot be recirculated "endlessly" in this way since the wash water only becomes more polluted the more exhaust gases are scrubbed therewith. Prior to being discharged into the sea, wash water has been diluted with water, but this does not eliminate the environmental problems caused by the effluent. No success has been achieved in purifying the wash water well enough to enable it to be discharged from the ship into the sea. A procedure according to which the wash water is collected to large tanks onboard the ship wherefrom it is pumped at a harbour and transported to purification plants ashore is, due to the large amount of wash water, so laborious that it is not implementable in practice.

The above-described ways to treat exhaust gases and impurities transferred from the exhaust gas scrubber to the wash water do not provide a good end result (do not eliminate impurities as efficiently as desired) or are complicated (e.g. the transfer of wash water from the ship to the shore) and necessitate the use of chemicals.

From U.S. Pat. No. 6,810,662 B2 an arrangement is known for purifying exhaust gases from a combustion engine in exhaust gas scrubbers. However, the document does not disclose how to treat wash water or reaction products produced when water reacts with compounds contained in the exhaust gases.

From GB 2288342 an arrangement is known for purifying exhaust gases from a combustion engine in an exhaust gas scrubber. The document discloses purification of wash water in a purification unit in which the solid impurity particles contained in the wash water are collected in a filter. The problem is, however, that the described purification unit is incapable of treating and removing from the wash water impurities dissolved therein, or extremely small impurity particles, either.

BRIEF DESCRIPTION OF THE INVENTION

An object of the invention is thus to provide a method for treating impurities contained in exhaust gases of ships, which method is easily implementable and capable of efficiently eliminating impurities.

In order to achieve this, the present invention provides a method for treating impurities contained in exhaust gases of ships in order to reduce sulphur oxide emissions, the method comprising:
- scrubbing with water the exhaust gases in an exhaust gas scrubber in order to reduce sulphur dioxide emissions of the exhaust gases,
- supplying wash water to be purified, i.e. effluent, containing impurities and exiting from the exhaust gas scrubber, to a purification unit onboard a ship, in which the effluent is purified, the purification unit comprising a purification device comprising a band filter comprising a moving inclined filter band,
- monitoring a pH value of the purified effluent, and if it is less than 6.5, the pH value of the effluent is adjusted to a value of at least 6.5, after which the purified effluent is discharged into a sea or returned to the exhaust gas scrubber,
- feeding an aqueous fluid containing impurities originating from the effluent together with one or more precipitating agents to a first surface of the inclined filter band of the band filter and filtering said aqueous fluid through the filter band in order to concentrate impurities contained in the aqueous fluid onto the first surface of the band filter as a precipitate to be removed from the first surface of the filter band.

Preferably, the filter band is an endless filter band which is preferably cleaned by spraying water onto a second surface of the filter band opposite to the first surface of the filter band.

The term "precipitating agent" refers to a chemical substance used for promoting molecular aggregation of substances present in water into particles. The term "precipitating agent" also refers to a chemical substance used for promoting aggregation of suspended particles present in water into a macroscopic mass (floc), also known as a flocculant. Preferably, an aluminium- and/or iron-based salt or salts, such as aluminium chloride, aluminium chlorine hydrate or polyamine chloride, aluminium sulphate, ferric chloride sulphate and/or ferrous sulphate, may be used as a precipitating agent according to the invention. Alternatively, anionic and/or cationic polymers, particularly cationic polyamines, polyacrylamide, copolymers of acrylamide or anionic copolymers of alkyl amide, may as such or together with an aluminium- and/or iron-based salt or salts be used as a precipitating agent according to the invention. The precipitating agent may be used as an aqueous polymer solution, for instance.

Preferably, the wash water to be purified, i.e. effluent, containing impurities and exiting from the exhaust gas scrubber, is purified in an effluent circuit included in the purification unit prior to feeding said aqueous fluid onto the inclined filter band of the band filter, the effluent circuit including at least one membrane filter, and the wash water to be purified, i.e. the effluent, is circulated in the effluent circuit in which the effluent is filtered through a semipermeable membrane of the membrane filter in order to achieve a purified effluent and a residue containing impurities, the purified effluent being removed from the membrane filter and from circulation in the effluent circuit while the residue keeps on circulating in the effluent circuit in which it concentrates, after which at least some of the concentrated residue in the effluent circuit, highly concentrated with impurities, is fed at intervals in the form of an aqueous fluid onto the inclined filter band of the band filter. Preferably, a filtrate exiting from the purification device is conveyed back to the effluent circuit to be further purified prior to being discharged into the sea or conveyed to the exhaust gas scrubber.

The impurity concentration of the effluent in the effluent circuit increases the more the more effluent is supplied to the effluent circuit, whereby the pressure difference required for carrying out the purification process increases. Consequently, at least some of the residue in the effluent circuit, highly concentrated with impurities, is at intervals removed from the effluent circuit, whereby preferably the effluent having a very high impurity concentration is further treated in the purification device. The amount and volume of the latter effluent is only a fraction as compared with the amount of wash water containing impurities and exiting from the exhaust gas scrubber into the purification unit and the amount of effluent purified in the purification unit. The precipitate obtained in the purification device is highly concentrated with impurities. The precipitate may be placed in a small container which is easy to move from the ship to the shore for disposal. It is to be noted that while cleaning the effluent circuit, it is not necessary to remove all the water concentrated with impurities in one go, although this is preferable so as to make the amount of effluent exiting from the effluent circuit small.

In order to maintain the purification capability of the membrane filter, the membrane filter is cleaned at intervals when its semipermeable membrane is filled with impurities. Preferably, the cleaning is carried out by backwashing, whereby the impurities in the semipermeable membrane of the membrane filter are removed. The removed impurities are fed to the purification device to be filtered off by means of its band filter.

In order for any largish solid impurities in the effluent not to collect in or obstruct the semipermeable membrane of the membrane filter, the effluent is preferably filtered by a coarse filter and/or a micro filter prior to supplying the effluent to the effluent circuit.

Preferred embodiments of the method according to the invention are disclosed in the attached claims.

The present invention provides a ship enabling the method according to the invention to be implemented, the ship comprising an exhaust gas scrubber for purifying exhaust gases from the ship's combustion engine and for reducing sulphur dioxide emissions, and a purification unit for purifying wash water to be purified, i.e. effluent, and exiting from the exhaust gas scrubber, wherein the purification unit comprises a purification device comprising a band filter comprising a moving inclined filter band for purifying impurities originating from the effluent.

Preferably, the purification unit further comprises an effluent circuit comprising a circulation pump and at least one membrane filter comprising a semipermeable membrane, the circulation pump being arranged to circulate the effluent to be purified in the effluent circuit by feeding the effluent to an inlet end of the membrane filter such that the effluent flowing through the membrane filter filters through the semipermeable membrane and exits, purified, from an outlet of the membrane filter and from the effluent circuit while a residue containing impurities is led from a discharge end of the membrane filter back to the circulation pump and from the circulation pump again to the inlet end of the membrane filter, the purification device being connected downstream of the discharge end of the membrane filter and being arranged to receive from the effluent circuit a residue highly concentrated with impurities in the form of an aqueous fluid in order to further concentrate this.

The effluent circuit may preferably comprise a plurality of membrane filters to enable the filtering efficiency of the purification unit to correspond with the need to purify even large amounts of impurities and a large volume of effluent, which in practice is the situation when large amounts of impurities are produced during combustion process because of the large amount of sulphur contained in the fuel and/or because of a (large) combustion engine consuming a lot of fuel. An appropriate filter set is achieved by building it from membrane filters available on the market.

Preferred embodiments of the ship according to the invention are disclosed in the attached claims.

The present invention provides a purification unit for purifying wash water, i.e. effluent, polluted with impurities and exiting from an exhaust gas scrubber of a ship, the purification unit being a transferrable container-like unit comprising a first connecting means for connecting the purification unit to an effluent line coming from the exhaust gas scrubber of the ship, a second connecting means for connecting the purification unit to a water distribution circuit of the ship, and an outlet line for discharging from the purification unit the effluent purified therein, the purification unit comprising a purification device comprising a band filter comprising a moving inclined filter band in order to concentrate impurities originating from the effluent onto a first surface of the filter band as a precipitate.

Preferably, the purification unit further comprises an effluent circuit comprising a circulation pump and at least one membrane filter comprising a semipermeable membrane, the circulation pump being arranged to circulate the effluent to be purified in the effluent circuit by feeding the effluent to an inlet end of the membrane filter such that the effluent flowing through the membrane filter filters through the semipermeable membrane and exits, purified, from an outlet of the membrane filter and from the effluent circuit while a residue containing impurities is led from a discharge end of the membrane filter back to the circulation pump and from the circulation pump again to the inlet end of the membrane filter, the purification device being connected downstream of the discharge end of the membrane filter and being arranged to receive from the effluent circuit a residue highly concentrated with impurities in the form of an aqueous fluid in order to further concentrate this into a precipitate.

Preferably, the purification unit comprises a third connecting means for connecting the purification unit to a pressurized air circuit of the ship so as to enable pressurized air to be applied to a clean side of the membrane filters.

A fundamental idea underlying the invention is to use a moving inclined filter band for purifying impurities originating from the effluent of a ship's exhaust gas scrubber. The filter band enables impurities dissolved in the effluent, which may be effluent concentrated in the effluent circuit, and microscopically small impurities in a highly concentrated form to be removed from the effluent with no need to use large storage tanks for intermediate storage of the effluent, and a vast majority of the treated waste water, purified as prescribed by regulations, to be pumped into the sea.

An advantage of the method and ship according to the invention is that owing to the technical operating principle and structure of the purification unit, the need for space required by this unit so small that the purification unit is easy to place onboard a ship. By efficient filtering, the purification unit is capable of purifying an aqueous fluid containing impurities originating from the effluent of an exhaust gas scrubber so efficiently that the purified water obtained in the filtration meets even strict requirements set for the purity of the water and can be discharged directly into the sea. Alternatively, the purified water obtained in the filtration may be returned back to the exhaust gas scrubber and recirculated. After filtration, the impurities can be collected, highly concentrated, in which case due to their small volume they are very easy to transfer to the shore for appropriate disposal or final treatment.

BRIEF DESCRIPTION OF THE FIGURES

The invention is now described in closer detail by means of two examples and with reference to the accompanying drawing, in which.

DETAILED DESCRIPTION OF THE INVENTION

Figure 1:
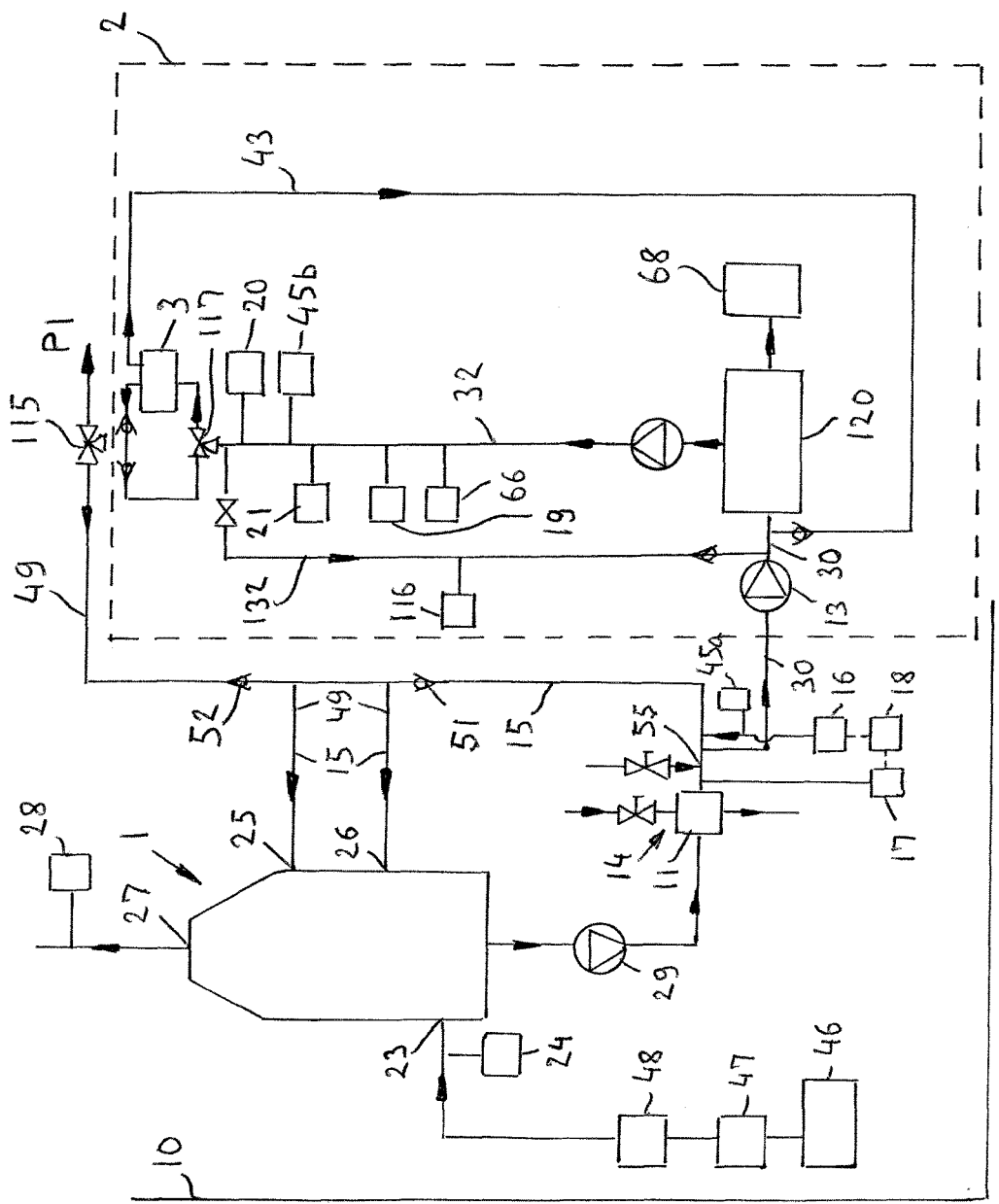
FIG. 1 illustrates a first embodiment of the invention for treating impurities contained in exhaust gases.

FIG. 1 shows an exhaust gas scrubber 1 onboard a ship and a purification unit 2 connected thereto for purifying wash water exiting from the exhaust gas scrubber. Reference number 10 illustrates a ship. The ship's combustion engine is illustrated by reference number 46, a catalyser connected to the combustion engine 46 is designated by reference number 47, while reference number 48 designates an exhaust gas boiler. The combustion engine 46 is a diesel engine. The catalyser 47 reduces nitrogen oxide emissions. Preferably, the catalyser 47 uses urea for reducing the nitrogen oxide emissions. The structure and operation of the catalyser 47 are not discussed in this connection since they are known to those skilled in the art. The exhaust gases cool down in the exhaust gas boiler 48. At the same time as the exhaust gas boiler 48 cools down the exhaust gases, heat energy is recovered from the exhaust gases for the ship's various heating needs. The operation of the exhaust gas boiler 48 is known to one skilled in the art, so the structure and operation of the exhaust gas boiler are not explained in closer detail herein.

In the arrangement of the figure, the exhaust gases from the combustion engine 46 of the ship 10 are at point 23 led into the exhaust gas scrubber 1. A measuring device 24 is used for determining the carbon dioxide concentration ($CO_2$ concentration) of the exhaust gases in percent by volume prior to feeding the exhaust gases to the exhaust gas scrubber 1. Because of the exhaust gas boiler 48, the exhaust gases arrive at the exhaust gas scrubber 1 cooled down, whereby their volume and flow rate are smaller than with no exhaust gas boiler 48 and the water demand for purifying the exhaust gases decreases. Water is sprayed onto the exhaust gases from points 25 and 26. Preferably, the water is basic, but neutral water may also be used. The number and location of spraying points 25, 26 may vary. The purified exhaust gases exit from the exhaust gas scrubber 1 at point 27. A measuring device 28 is used for determining the sulphur dioxide concentration ($SO_2$ concentration) of the exhaust gases exiting from the exhaust gas scrubber. When scrubbing the exhaust gases, a ratio of $SO_2/CO_2$ is measured, where $SO_2$ is the sulphur dioxide concentration in percent by volume in flue gas after flue gas purification and $CO_2$ is the carbon dioxide concentration in percent by volume prior to flue gas purification. By adjusting the amount of water supplied to the exhaust gas scrubber, the operation of the exhaust gas scrubber 1 is adjusted such that the ratio $SO_2/CO_2$ is below a given required value, less than 25 ppm $SO_2/CO_2\%$ (v/v) (that is $SO_2$ (ppm)/$CO_2$ (% v/v)), preferably less than 10 ppm $SO_2/CO_2\%$ (v/v), and most preferably less than 4.3 ppm $SO_2/CO_2\%$ (v/v). The scrubbing of exhaust gases in an exhaust gas scrubber 1 being known, the procedure of carrying out the scrubbing is not explained in closer detail herein.

When scrubbing exhaust gases, both solid impurities and impurities dissolved in water collect in the wash water. The hot wash water containing impurities and directed at the bottom of the exhaust gas scrubber 1 is cooled down by a cooling apparatus 14 arranged upstream of the purification unit 2. The hot wash water is pumped by a pump 29 to the cooling apparatus 14 comprising a heat exchanger 11. The pump 29 is a centrifugal type of pump, for instance. Cold raw water is supplied to the heat exchanger 11, whereby the temperature of the hot wash water supplied to the heat exchanger drops in the heat exchanger e.g. from a value of about 80° C. to a value of 30° C. The raw water is sea water or, alternatively, it may be fresh water (river or lake water). The wash water is thus led cooled down along a line 15 back to the exhaust gas scrubber 1.

It is ensured that the pH value of the wash water exiting from the heat exchanger 11 and returning to the exhaust gas scrubber 1 is at least 7. In practice, this is carried out such that a measuring means 17 determines the pH value of the wash water, and if the pH value measured by the measuring means 17 is less than 7, a base is fed to the wash water by feeding means 16 so that a pH value of at least 7, preferably 7.5, is achieved. The base to be used is e.g. lye, i.e. sodium hydroxide (NaOH), or another neutralising substance. Control means 18 control preferably automatically the operation of the feeding means 16. The feed rate of wash water to the exhaust gas scrubber 1 is in the order of 100 to 1000 m³/h, mostly depending on the engine power of the ship. In small engines in particular, the feed rate may be less than 100 m³/h, for instance 40 to 100 m³/h. The wash water feed rate is typically 20 to 50 m³/MWh. Thus, the water feed rate for a heavy oil operated diesel engine of about 6000 kW power may typically be 30 to 300 m³/h, and more typically 100 to 250 m³/h, when the wash water feed pressure is 3 to 5 bar. It is possible that the feed pressure is higher than this, in which case the wash water feed rate may be reduced.

When necessary, more water is fed to the line 15 leading to the exhaust gas scrubber 1. Reference number 55 designates the water feeding point to the line 15. The water may be fresh water or salt water. The line 15 may also be fed with water purified in the purification unit 2 to be described below, and this water is led along a line 49 (outlet line) to the exhaust gas scrubber 1, resulting in internal circulation.

Downstream of the heat exchanger 11, a line 30 starts for the purification unit 2 for purifying the wash water containing impurities, i.e. the effluent, in the purification unit. A feed pump 13 feeds the effluent to a purification device 120 of the purification unit 2, whose structure will be explained in closer detail below by referring to FIGS. 2 and 3. The effluent feed rate is about 0.1 to 5 m³/h. The magnitude of the feed rate highly depends on the ship's engine power and the sulphur content of the fuel. Preferably, the feed pump 13 is of the displacement pump (positive-displacement pump) type but a pump of another type may be used. The pressure of the effluent in the line 30 upstream of the feed pump 13 is 0.1 to 10 bar, e.g. 3 to 5 bar. Downstream of the feed pump 13 it will suffice that the pressure in the line 30 is high enough to convey the effluent to the purification device 120, e.g. to a mixing vessel 119 provided therein.

The effluent can be filtered by the purification device of the purification unit 2 such that the purified effluent may be run along a line 32 and discharged into the sea at point P1. A precipitate, i.e. a mushy material having a high impurity concentration, is led to a sludge receptacle 68. The purified effluent may also be led to the exhaust gas scrubber 1 along the line 49. A three-way valve 115 may be used for controlling the transfer of the purified water into the sea or to the exhaust gas scrubber 1. Before the purified effluent may be discharged into the sea, its pH value and turbidity have to fulfil certain values. These values will be shown below. Reference number 19 designates a measuring means, arranged downstream of the purification device 120, for determining the pH value of the effluent purified of impurities. If the pH value is below a permitted value, a base is added from a base feeding device 20. Reference number 21 designates a measuring means for determining the turbidity of the purified water. If a set turbidity value is exceeded, activated charcoal is mixed with the purified effluent by an activated charcoal feeding device 116 and the purified effluent is led back to the purification device 120 along a line 132. The purification device 120 also makes it possible to reduce polycyclic aromatic hydrocarbons (PAH) contained in the effluent. Reference number 45b designates a measuring device for determining the PAH concentration in the effluent. Reference number 66 designates an ion exchange apparatus which enables metal ions, nitrates, and nitrites to be purified. Typically, a vast majority of the purified effluent is discharged into the sea, but it may also be led back to the exhaust gas scrubber 1.

Figure 1A:
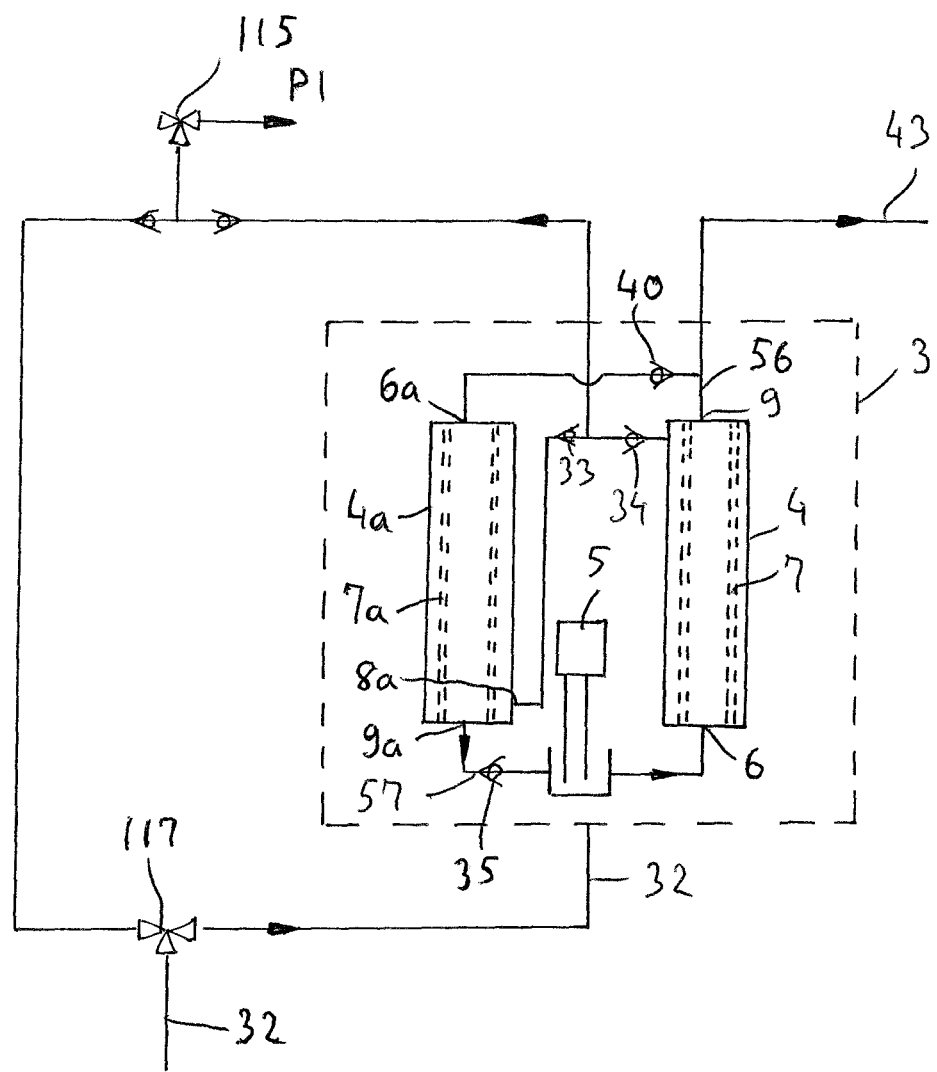
FIG. 1a shows an effluent circuit utilizable in the embodiment of FIG. 1, FIGS. 2 and 3 are side and front views, respectively, illustrating a purification device used in the embodiment of FIG. 1.

When necessary, i.e. if the composition of the effluent to be purified and exiting from the exhaust gas scrubber 1 is such that the purification device 120 is incapable of purifying it so as to completely comply with set requirements and recommendations, e.g. those set forth in the IMO resolution MEPC.184(59) ("GUIDELINES FOR EXHAUST GAS CLEANING SYSTEMS") issued in 2009, the filtrate obtained from the purification device 120, i.e. the purified effluent, is further conveyed to an effluent circuit 3 to be purified prior to being discharged into the sea. By means of a three-way valve 117 the filtrate (water) of the purification device 120 may be led to the effluent circuit 3 or, alternatively, directly into the sea (via the valve 115, at point P1). The structure of the effluent circuit 3 is illustrated in FIG. 1a. The effluent circuit 3 comprises a circulation pump 5 and at least one membrane filter 4 comprising a semipermeable membrane 7, the circulation pump being arranged to circulate the filtrate exiting from the purification device 120, i.e. water to be further purified, in the effluent circuit by feeding the filtrate to an inlet end 6 of the membrane filter 4 such that the filtrate (water) flowing through the membrane filter filters through the semipermeable membrane 7 and exits, further purified (even cleaner), from an outlet 8 of the membrane filter 4 and from the effluent circuit 3 while a residue containing impurities is led from a discharge end 9 of the membrane filter back to the circulation pump 5 and from the circulation pump again to the inlet end 6 of the membrane filter. When the water exiting from the purification device 120 and to be further purified circulates in the effluent circuit 3, it becomes concentrated with the impurities dissolved in the water. This water concentrated with impurities is at intervals and together with a precipitating agent, via a line 43, led back to the purification device 120 in which the impurities are removed to the sludge receptacle 68. The water exiting from the effluent circuit 3 that has been further purified is so clean that, complying even with very strict requirements set for the purity of the water, it can be discharged into the sea (via the valve 115 at point P1). No effluent circuit 3 is necessary in the embodiment of FIG. 1, but when the capacity of the purifying device 120 is insufficient for purifying the effluent sufficiently, an effluent circuit 3 is necessary. Unlike in FIG. 1, in the embodiments of FIGS. 4 and 5a, 5b an effluent circuit is necessary. Since in the embodiment of FIG. 4 the structure and operation of the effluent circuit is explained in detail, the operation of the effluent circuit is not explained in closer detail in connection with FIGS. 1 and 1a. In the embodiment of FIG. 1 as well the effluent circuit comprises a backwashing arrangement which corresponds with the one shown in FIG. 4 but which, for the sake of simplicity, is not shown in FIG. 1a. Preferably, an aluminium- and/or iron-based salt or salts, such as aluminium sulphate, ferric chloride sulphate and/or ferrous sulphate, may be used as a precipitating agent. An appropriate or the most appropriate precipitating agent can be found through experimenting. It is not very laborious to find an appropriate precipitating agent.

Figure 2:
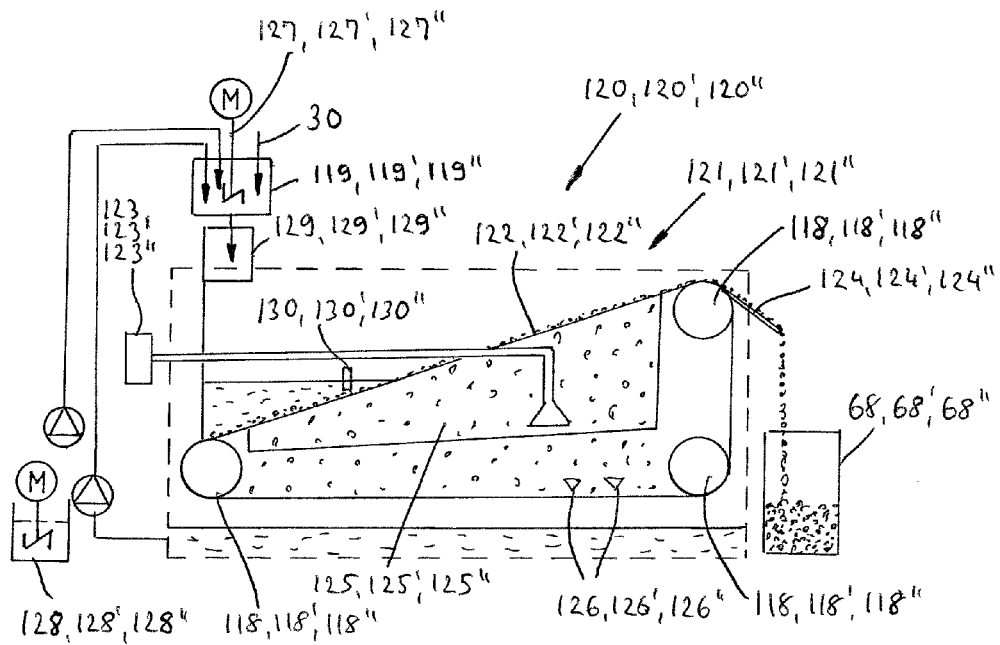
Figure 3:
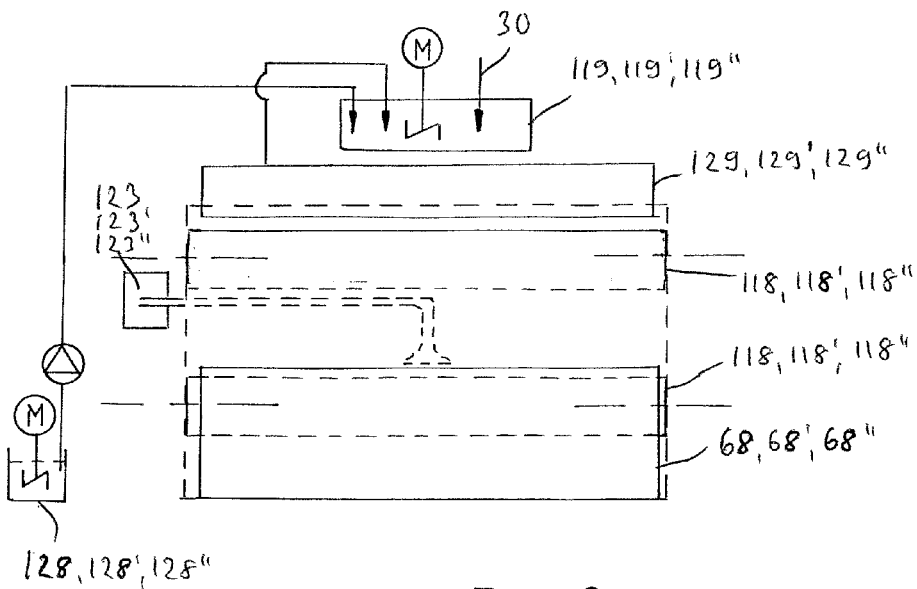

FIGS. 2 and 3 are side and front views, respectively, illustrating the purification device 120 shown in FIG. 1. The purification device 120 comprises a band filter 121 which comprises a moving (movable) inclined filter band 122. The width of the filter band 122 is about 1000 mm. The filter band 122 comprises a porous stainless steel wire mesh band. The pore size of the filter band 122 is roughly within a range of 30 to 120 µm, more preferably within a range of 30 to 100 µm, and most preferably within a range of 30 to 80 µm. The filter band 122 is endless and controlled by three rolls 118. The number of rolls 118 may vary. The filter band 122, which is sealed at its edges, defines a space 125 for receiving the filtrate purified of impurities, i.e. purified water. The sealing is achieved by means of sides (not shown) of the purification device 120, the sides being perpendicular to the transverse direction of the filter band 122. Underpressure may be arranged in the space 125 by underpressure means 123 in order to arrange underpressure in the inclined portion of the filter band 122, on the clean side of the filter band. The underpressure means 123 may be a suction device since the underpressure does not have to be great. Reference number 126 designates spraying means for cleaning the filter band while reference number 124 designates a scraper for removing precipitate from a first surface (upper surface) of the filter band 122 after most of the precipitate has been removed by the scraper 124. Simultaneously with spraying water by the spraying means 126, it is possible to use mechanical brushing to enhance the removal of residual impurities still remaining after scraping from the filter band 122. The purification device 120 also includes feeding means for feeding a precipitating agent to the band filter 121. The feeding means are described in connection with the description of the operation of the purification device 120.

In the following, the operation of the purification device 120 will be explained.

The effluent to be purified and exiting from the exhaust gas scrubber 1 as well as a precipitating agent are fed to the mixing vessel 119. The volume of the mixing vessel 119 is 30 to 1000 L. The precipitating agent is mixed by means of a motor-driven mixer 127 in the mixing vessel 119 for a couple of minutes, e.g. 3 to 5 min. The precipitating agent may be fed as a finished solution to the mixing vessel 119. The solution may be prepared in a vessel 128 in which a precipitating agent in powder form is mixed with clean water, after which the solution is pumped to the mixing vessel 119. The precipitating agent makes the impurities in the effluent agglomerate and flocculate. A mixture of the effluent to be purified and the precipitating agent is fed via a valve (not shown) from the mixing vessel to a spreading box 129 from which the mixture is spread onto the inclined portion of the upper surface of the filter band 122, substantially over the entire width of the filter band. Consequently, the width of the spreading box 129 substantially corresponds with the width of the filter band 122. The mixture is allowed to filter on the filter band so that the impurities in the mixture concentrate onto the upper surface of the filter band 122 as a precipitate which is easy to remove by the scraper 124 which with a small pressure presses against the upper surface of the filter band, and a filtrate free of impurities passes through the filter band into the space 125 from which it is removed to the line 32 (cf. FIG. 1). In order to quicken and enhance the operation of the purification device, the filter band 122 is by the underpressure means 123 subjected to underpressure such that on its second inclined surface, i.e. the clean inclined surface, which is opposite to its first inclined surface, the pressure is lower than on the first inclined surface. Underpressure is arranged in the space 125 into which the filtrate passes. The magnitude of the underpressure is e.g. 0.2 to 0.4 bar. Owing to the underpressure, the water content in the precipitate drops quickly before the precipitate moves to a point where it is scraped off and led to the sludge receptacle 68. Thus, the precipitate removed from the filter band resembles a thick mushy mass and it is highly concentrated, containing a large amount of impurities and only little water. The volume of the sludge receptacle 68 may be small, and it is easy to transfer from the ship to the shore for further treatment of its contents. The filtrate free of impurities is led along the line 32 into the sea (cf. FIG. 1 wherein P1 designates the point from which the clean water is discharged into the sea). When desired, a portion, typically a small portion, of the filtrate may be led via the line 49 back to the exhaust gas scrubber 1. When necessary, the filtrate is further led to the effluent circuit 3 prior to being discharged into the sea. The three-way valve 117 is used for leading the water purified by the purification device 120 either directly into the sea or to the effluent circuit 3, from which it is discharged into the sea. Reference number 43 designates a line via which a residue concentrated in the effluent circuit 3 may be led back to the purification device 120 for purification.

Since it is impossible to get all the precipitate removed from the filter band 122 by the scraper 124, the purification device 120 comprises spraying devices 126 for spraying water to the clean side of the filter band 122, enabling the residual impurities on the first, i.e. dirty, side of the filter band to be removed. The removed impurities may together with one or more precipitating agents be led back to the inclined filter band 122 of the purification device 120 to be removed by the scraper 124. In practice, the impurities are led to the mixing vessel 119 and via the spreading box 129 to the filter band 122.

Typically, the filter band of the purification device 120 moves intermittently, in which case its rate of movement is about 0.1 to 0.4 m/min. In FIG. 2, the effluent to be purified resides at a height which covers only a small portion of the length of the inclined filter band 122. When more effluent to be purified is fed from the spreading box 129 onto the stationary (not moving) inclined filter band 122, the height of the effluent rises so that the effluent to be purified covers more and more of the length of the inclined filter band 122. When the height of the effluent rises to a certain level, a float 130 starts a motor (not shown) which starts the endless filter band moving. In such a case, material containing a lot of impurities and to be scraped off moves towards the scraper 124 while at the same time a purified filter band moves to the lowest point of the inclined filter band 122, i.e. above the roll 118 to the left, through which the water contained in the effluent is easily filtered since the filter band is cleaned and unclogged. As a result of the quick permeation of the water, the height of the effluent on the inclined filter band 122 drops enough for the float 130 to stop the movement of the filter band 122. Only after the height of the effluent collected on the upper surface of the inclined filter band 122 has risen sufficiently high does the float 130 start the motor again and the mushy precipitate continues to move towards the scraper 124.

Figure 5A:
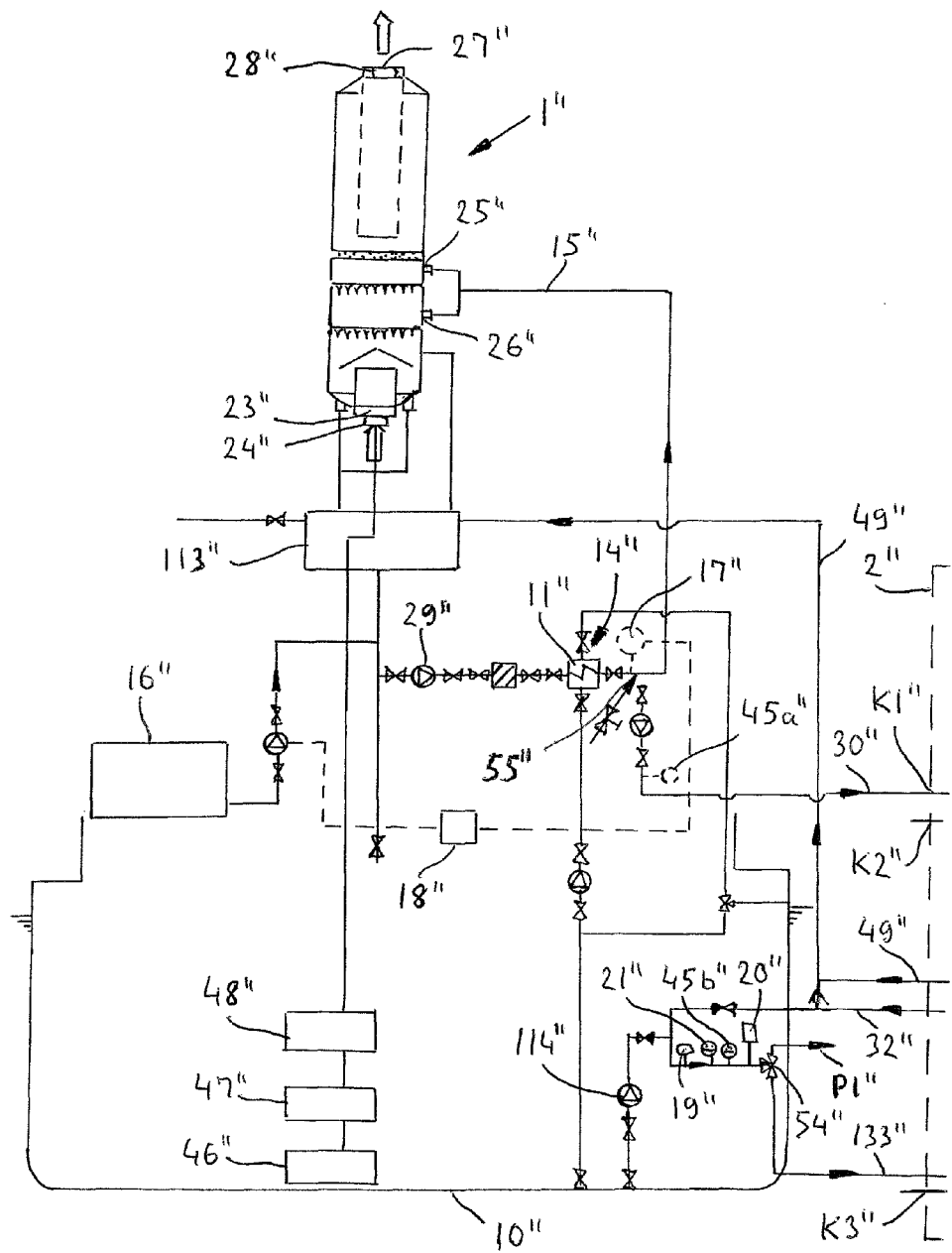
FIGS. 5a and 5b show a third embodiment of the invention and an arrangement for treating impurities contained in exhaust gases.
Figure 5B:
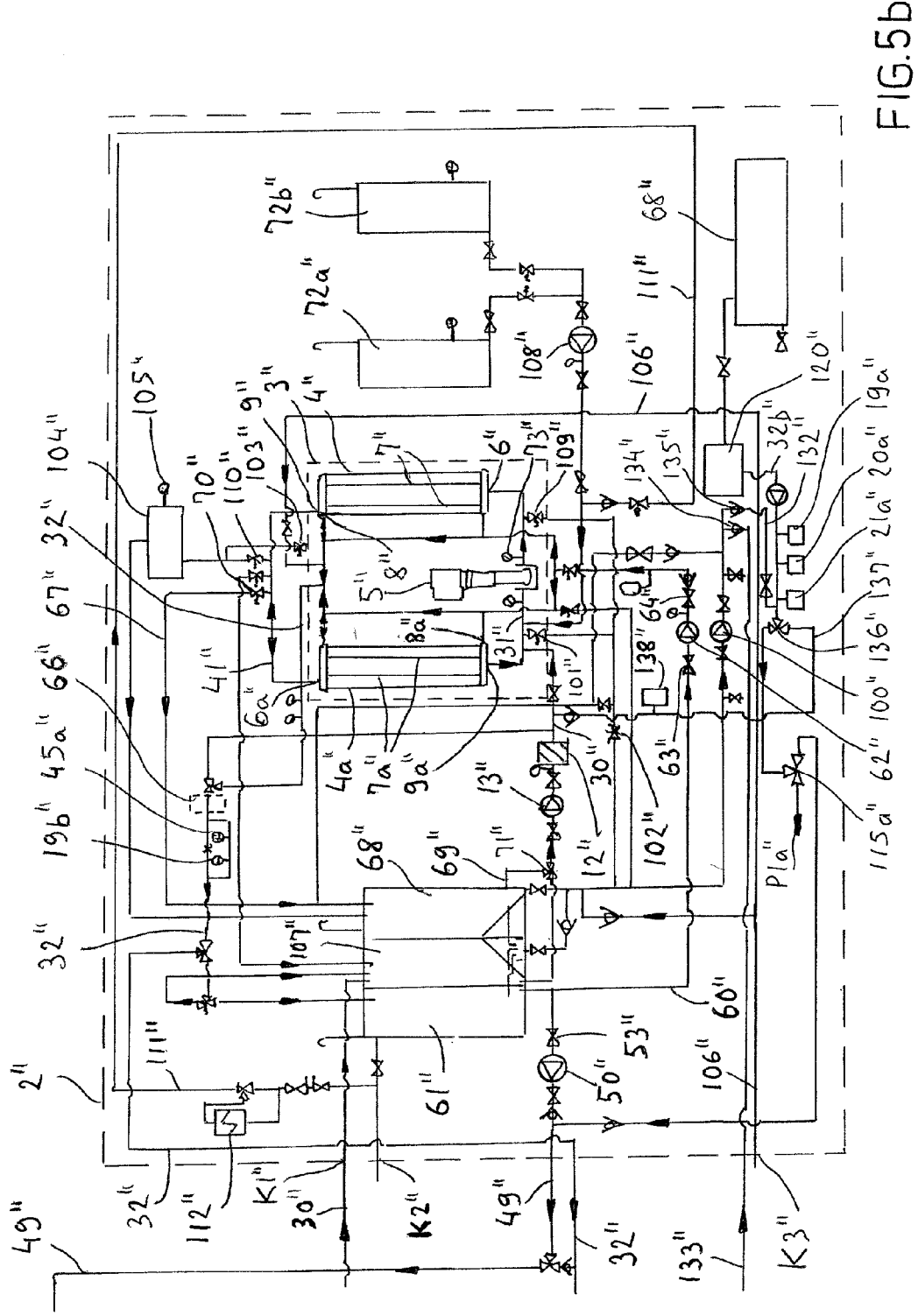

The purification unit 2 of FIG. 1, like the purification unit of FIGS. 5a, 5b, may be implemented as a transferrable container-like unit provided with connecting means for connecting it to the effluent line 30 from the ship's exhaust gas scrubber and for connecting it to the ship's water distribution circuit and possibly to the ship's pressurized air circuit. Such connecting means (which are not shown in FIG. 1) will be explained below in connection with the embodiment of FIGS. 5a, 5b.

Figure 4:
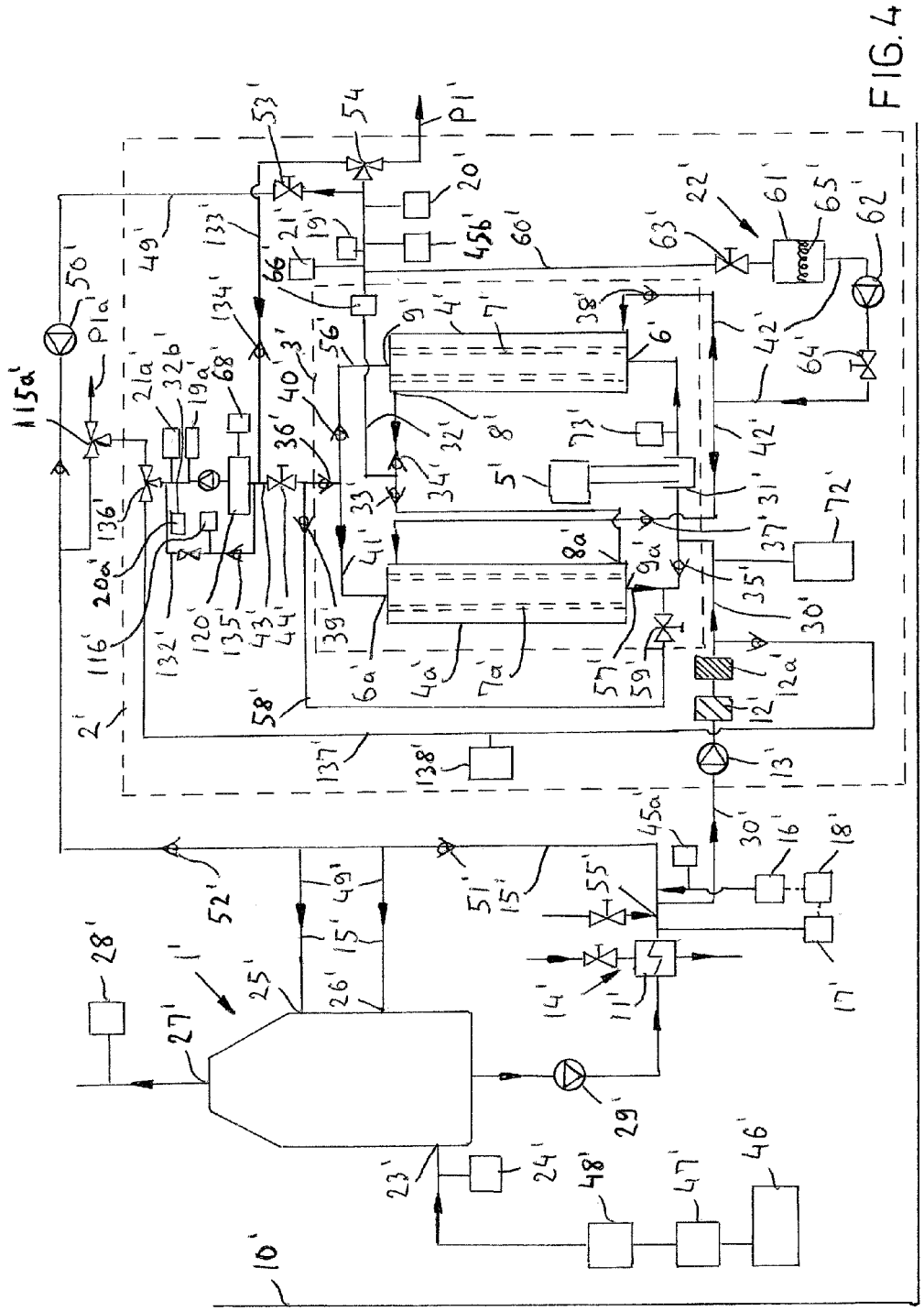
FIG. 4 illustrates a second embodiment of the invention for treating impurities contained in exhaust gases.

FIG. 4 shows an embodiment wherein the purification device 120' of FIGS. 2 and 3 is used such that the effluent from the exhaust gas scrubber 1' is first purified in the effluent circuit 3' prior to carrying out purification by the purification device 120'. FIG. 4 uses the same reference numbers as FIG. 1 to identify like structures.

In the embodiment of FIG. 4, a feed pump 13' feeds effluent via a coarse filter 12' to an effluent circuit 3'. The effluent feed rate is about 0.1 to 5 m³/h. The magnitude of the feed rate highly depends on the ship's engine power and the sulphur content of the fuel. Preferably, the feed pump 13' is a displacement type pump (positive-displacement pump), and it is arranged to produce a pressure of 0.1 to 5 bar in the line 30' downstream of the feed pump. The pressure may also be more than 5 bar, for instance 10 bar. The advantage of a displacement pump, which is e.g. of the eccentric screw pump type, is that it is highly resistant to dirt and corrosion and does not much mix the medium it is pumping. The pressure of the effluent in the line 30' upstream of the feed pump 13' is 0.1 to 10 bar, e.g. 3 to 5 bar, but may be higher than this. The pore size of the coarse filter 12' is selected such that solid impurity particles larger than 5 μm in size are filtered out; particles smaller than this pass through the filter. Typically, the pore size of the coarse filter 12' is selected such that impurity particles at least 40 μm in size, e.g. at least 50 to 100 μm, are filtered out. Such impurity particles include rust scales, large soot particles, and possible salt crystals. The coarse filter 12' is preferably a wire mesh filter. After the coarse filter 12' downstream of the coarse filter, a second filter 12a' is arranged for filtering impurity particles whose size is larger than 0.4 μm. The pore size of the filter 12a' is selected such that it filters out solid impurity particles whose size is larger than e.g. 10 μm. The filter 12a' may be called a micro filter. The filter 12a' filters inter alia small soot particles and possible small salt crystals present in the effluent. It is thought that the filter 12a' reduces the need to clean membrane filters 4', 4a' included in the purification unit 2'. The filters 12', 12a' may comprise cleanable or replaceable filter elements. The coarse filter 12' may alternatively be an automatic, self-cleaning filter.

The effluent that has undergone the above-described preliminary filtration is led to the effluent circuit 3'. The effluent circuit 3' comprises two series-connected membrane filters 4', 4a' which comprise a semipermeable membrane 7', 7a' serving as a film. The membrane filters 4', 4a' are capable of filtering impurities whose size is less than 0.1 μm. The membrane filters are commonly commercially available filters. Preferably, they are ceramic filters with an elongated frame structure made of a ceramic material and comprising a plurality of borings or channels extending from an outlet end 6', 6a' of the membrane filter to a discharge end 9, 9a of the membrane filter. The material of the ceramic frame is e.g. sintered alumina ($Al_2O_3$), titanium oxide ($TiO_2$), silicon oxide ($SiO_2$) or zirconium oxide ($ZrO_2$). For the sake of simplicity, only two borings are illustrated in the figure in broken line. The diameter of the borings is e.g. 3 to 4 mm, and the length of the membrane filter is e.g. about 1000 mm. The active layers (membranes) of the membrane filter are typically made of the same oxides as the frame structure. The active layer is thus e.g. titanium oxide ($TiO_2$) if the membrane filter is of the micro filter type, and may be e.g. zirconium oxide ($ZrO_2$) if the filter is of an ultrafilter type or a nanofilter type. The active layer may also consist of sintered alumina ($Al_2O_3$) and silicon oxide ($SiO_2$) or combinations of said oxides. Instead of an oxide layer, it is feasible that an active layer is made of an appropriate silicate or carbide. The material constituting a semipermeable membrane is porous so that it enables selective permeation of water molecules contained in the effluent on condition that the pressure is sufficiently high. The material constituting the semipermeable membrane does not, however, enable permeation of compounds dissolved in the effluent, such as dissolved carbon compounds, hydrocarbon compounds, nitrogen compounds (such as nitrates and nitrites) and sulphur compounds (such as sulphates and sulphites) and extremely small solid impurity particles, so these keep on circulating in the effluent circuit 3'. Depending on the type and pore size of the membrane filter, the membrane filters 4', 4a' may be used for filtering out particles whose size is as small as few nanometers only. A water molecule penetrates the semipermeable membrane of the membrane filter since its size is only about 0.3 nm.

Preferably, an ultrafilter or a nanofilter and, if permeation of very small matter is to be prevented, possibly a reverse osmosis filter, may be used as the membrane filter 4', 4a'. The filtration capacity of a nanofilter is within a range of about 0.0008 to 0.008 μm (molecular weight of about 200 to 15000 being filtered out) while a reverse osmosis filter passes therethrough matter having the size of less than about 0.0011 μm (about 1 nm) whose molecular weight is within a range of 1 to 400. Metal ions can be filtered out by the reverse osmosis filter but nanofilters pass metal ions. The advantage of nanofilters is that they operate at a lower pressure than the reverse osmosis filter. The pore size of the membrane filter 4', 4a' is selected such that it meets the requirements set for water purification. Those skilled in the art are capable of selecting the membrane filter on the basis of their common knowledge or by trial; the selection requires no unreasonable effort. The physical implementation of the membrane filter may vary greatly; it may be in spiral form (comprising several fibre layers), in tubular form, etc. A filter manufactured by Pall Filtersystems GmbH under the trade name SCHUMASIV (type Pall-MF 0050T6021) with a pore size of 0.05 μm may be used as the membrane filter 4', 4a', for instance.

The effluent circulates in the effluent circuit 3' by means of a circulation pump 5'. The effluent circulation rate in the effluent circuit is 50 to 110 $m^3/h$, e.g. 50 to 70 $m^3/h$, depending inter alia on the number of membrane filters 4', 4a' and as far as the operation of the membrane filters is concerned in order to achieve the optimal flow rate (in unit m/s), and the pressure in the effluent circuit 3' is e.g. 2 to 7 bar, and may typically be 3 to 5 bar, but more than 7 bar, e.g. a range of 7 to 100 bar may be feasible. The optimal flow rate may be 4 to 6 m/s, for instance. From outlets 8', 8a' of the membrane filters 4', 4a', through the semipermeable membrane 7', 7a', a filtrate, which is purified effluent, is discharged into a line 32'. The rate of flow of purified effluent in the line 32' is 1 $m^3/h$, for instance. The rate of flow highly depends on the engine power of the ship and the efficiency of the purification unit 2', which has to be dimensioned to correspond with the purification demand. The rate of flow in the line 32' may thus vary greatly, e.g. 0.5 to 5 $m^3/h$. From the discharge end 9' of the membrane filter 4' a residue, i.e. effluent containing impurities, exits into the inlet end 6a' of the membrane filter 4a', and from the discharge end 9a' of the membrane filter 4a' a residue, i.e. effluent containing impurities, exits into an inlet end 31' of the circulation pump 5'.

It is feasible that while circulating the effluent, the membrane 7', 7a' is subjected to ultrasounds at a frequency of 30 to 70 kHz, e.g. 50 kHz, and/or to vibration at a frequency of 50 to 1000 Hz in order to improve the separating power (efficiency of purification) of the membrane filter. The membrane can be made to vibrate by placing it in a vibrating fixture or housing (not shown).

Reference numbers 33' to 40' designate return valves. The return valves 33' to 40' ensure that the fluid is not allowed to circulate in a wrong direction as far as the operation of the purification apparatus is concerned.

The purified effluent exiting from the effluent circuit 3', i.e. the filtrate of the effluent circuit, is led to the line 32'. A measuring means 19' is connected to the line 32' for measuring the pH value of the purified effluent exiting from the membrane filters 4', 4a'. If the pH value is below 6.5, a feeding device 20' is used for adding a base, e.g. lye, to the exiting water so that the pH value is at least 6.5. Temporarily, in manoeuvring situations, when the load on the combustion engine varies, it may be allowable that the pH value of the purified water differs by about two pH units from the pH value of the water taken onboard the ship.

A measuring means 21' is also connected to the line 32' for measuring turbidity of the purified effluent. Preferably, the turbidity must not on average (measured in a time period of more than 15 minutes) be more than 25 FNU above the value of the water taken onboard the ship, where FNU is the unit for turbidity and refers to "Formazin Nephelomeric Units". Said turbidity may also be given as a value of 25 NTU, where NTU refers to "Nephelometric Turbidity Units". The turbidity of water may be measured by a device called a nephelometer which comprises a detector for measuring how small particles contained in water scatter light. The detector is set off a light beam. If the water contains a large amount of small particles, more light is reflected into the detector than if the amount of small particles is small. A calibrated nephelometer measures the turbidity of water in NTU. The ISO 7027 standard provides a test method for determining the turbidity of water.

The purified water flowing in the line 32' downstream of a measuring device 45*b*' (measuring device for determining the PAH concentration) may be discharged via a valve 54' into the sea (at point P1') and/or back to the exhaust gas scrubber 1' via a line 49', provided, of course, that the water is sufficiently clean. When necessary, a pump 50' increases the pressure of the water in the line 49' such that the pressure of the water fed to the line 15' as described above does not exceed the pressure in the line 49'. If it is desired that all purified effluent is led to the exhaust gas scrubber 1', no liquid is to flow via the valve 54' in the line 32', i.e. it has to be closed. If it is desired that all purified effluent coming from the line 32' is discharged into the sea, a valve 53' in the line 49' has to be closed. Preferably, a junction of the lines 32' and 49' is provided with a three-way valve (not shown) for adjusting the magnitude of proportion of the purified water to be fed back to the exhaust gas scrubber 1, in which case a proportion not being fed to the exhaust gas scrubber 1' is discharged directly into the sea (at point P1') or via a purification device 120' into the sea (at point P1*a*'). The three-way valve is preferably automatic.

When the effluent is circulated in the effluent circuit 3', solid microscopically small impurities collect in the semipermeable membranes 7', 7*a*' of the membrane filters 4', 4*a*'. At the same time, the effluent becomes concentrated with impurities, since the impurities dissolved in water do not collect in the membrane filters 4', 4*a*' but keep on circulating in the effluent circuit 3'. The effluent circuit 3' is at intervals to be emptied of the effluent concentrated with impurities. The emptying is carried out by conveying the concentrated effluent to the purification device 120'. The purification unit 120' is as shown in FIGS. 2, 3 and as that used in the embodiment of FIG. 1. In the embodiment of FIG. 4, the effluent fed to the purification unit 120' is concentrated, containing more dissolved impurities than the effluent in the embodiment of FIG. 1. A precipitating agent is also used in connection with the embodiment of FIG. 4. The purification unit 120' purifies the concentrated effluent fed thereto such that a mushy precipitate containing a very high amount of impurities and only little water is obtained. The precipitate is conveyed to a sludge receptacle 68'. The sludge receptacle 68' is small, and it may be taken to the shore to be emptied for further treatment. Such further treatment may be combustion in a hazardous waste treatment plant. Prior to the removal of water from the purification device 120', the pH value and turbidity of the water is measured by measuring devices 19*a*' and 21*a*', respectively. When necessary, a base is fed by a feeding device 20*a*' to the water so that its pH value is as desired (more than 6.5, preferably about 7). If the purity (quality) of the purified water does not fulfil the requirements, the water may be returned via a line 132' to the purification device 120' in which by means of activated charcoal and a precipitating agent and after filtering taking place in the purification unit 120' a precipitate is achieved which contains activated charcoal and precipitating agent, and a filtrate, which is clear water, is obtained. The residue is conveyed to the sludge receptacle 68'. When necessary, the pH of the purified water may be adjusted by the base feeding device 20*a*'. The filtrate, i.e. the purified water, may be discharged into the sea or led to the exhaust gas scrubber 1' provided, of course, that it is pure enough. By means of a three-way valve 115*a*', the filtrate may be led into the sea (at point P1*a*') and/or to the exhaust gas scrubber 1'. When water is clarified by means of the purification device 120', no concentrated effluent is fed from the effluent circuit 3' to the purification device 120', i.e. a valve 36' is closed.

The concentrated effluent exiting from the effluent circuit 3' is at intervals conveyed via the valve 36' to the purification device 120' to be purified by using a precipitating agent, as disclosed above. If the concentrated water cannot be made pure enough by the purification device 120', the water is conveyed via a three-way valve 136' and a line 137' back to the effluent circuit 3' to be further purified. Further, the water to be purified is circulated in the effluent circuit 3' and/or treated in the purification device 120' until it is sufficiently pure to be discharged into the sea at point P1' or P1*a*'. Alternatively, this pure water may be conveyed to the exhaust gas scrubber 1'.

The purified water exiting via the line 32' may be led via a line 133' to the purification device 120' in order to clarify it by using activated charcoal and a precipitating agent. The amount of activated charcoal per each cubic meter of purified water is roughly 1 to 3 kg. The activated charcoal is in the form of granulate. The filtration of the purification device 120' results in a clear filtrate that may be discharged into the sea (at point P1*a*') or returned to the exhaust gas scrubber 1' along the line 49'. It is feasible that instead of clarification of water taking place by the purification device 120', alternatively or additionally the water may be clarified by selecting the filters 12', 12*a*', 4, 4*a*' and operating parameters of the purification unit so that the required turbidity values are also met.

At intervals, the membrane filters 4', 4*a*' of the effluent circuit 3' have to be cleaned of effluent and collected impurities since solid microscopically small impurities collect in their semipermeable membranes 7', 7*a*' when the effluent circulates in the effluent circuit 3'. New effluent is fed from the line 30' to the effluent circuit 3' as purified effluent exits from the line 32', in which case the semipermeable membranes 7', 7*a*' of the membrane filters 4', 4*a*' gradually become filled with solid, extremely small impurities, such as soot particles. When impurities collect in the membranes 7', 7*a*' of the membrane filters 4', 4*a*', the filtration capacity of the membrane filters decreases. The purification capacity of the membranes 7', 7*a*' is restored when they are cleaned. The effluent circuit 3' is cleaned when the pressure difference becomes disadvantageously large for carrying out membrane filtration and the impurity concentration of the effluent circulating in the effluent circuit has become high.

When the effluent circuit 3' is cleaned, it is emptied of effluent. The cleaning of the effluent circuit 3' by emptying is carried out by leading purified water from the line 32' via a line 60' to a water tank 61' wherefrom along a line 42' water is led to the effluent circuit 3', to the "clean side" of the membrane filters 4', 4*a*'. Alternatively, the effluent circuit 3' may be emptied by using water to be obtained from a source other than the purified water exiting from the effluent circuit. Since water is applied to the "clean side" of the membrane filters 4', 4a', it may be said that the effluent circuit is subjected to backwashing. Reference number 62' designates a pump used for increasing the pressure in the line 42' to be higher than the pressure in the line 60'. The pressure in the line 42' is preferably 6 to 12 bar, for instance 8 bar. The line 42', the pump 62', and the water tank 61' together constitute a washing device 22'. Water led from the line 42' to the "clean side" of the membrane filters 4', 4a' at a relatively high pressure (preferably 6 to 12 bar) removes impurities collected in the membranes 7', 7a' of the membrane filters. When purified water (or another appropriate fluid) is fed by the washing device 22' via the line 42' towards the membranes 7', 7a' in a direction which is opposite to the direction in which the effluent purified of impurities flows through the membranes 7', 7a', the solid impurities collected in the membranes 7', 7a' can be removed and conveyed into the line 43'. Preferably, the water (or another fluid) led towards the membranes 7', 7a' via the line 42' may be supplied as pressure pulses, which enhances the removal of impurities from the membranes 7, 7a'. While the washing device 22' empties the effluent circuit 3' of effluent containing a large amount of dissolved impurities, it simultaneously cleans the membranes 7', 7a' of the membrane filters 4', 4a' of solid impurities. In order to improve the cleaning efficiency, the water may be led to the effluent circuit heated, e.g. to a temperature of 30 to 70° C. The water tank 61' is preferably provided with a heating device 65', e.g. electric resistors, for heating the water. The volume of the water tank 61' is e.g. 50 to 150 L. Preferably, the water tank 61' is heat-insulated. A valve 63' is used for controlling the access of water into the water tank 61'. A valve 64' is used for controlling the access of water into the membrane filters 4', 4a'. While cleaning the effluent circuit 3', the circulation pump 5' is stopped. When water is fed by the washing device 22' to the effluent circuit 3' including its membrane filters 4', 4a', the effluent in the membrane filters 4', 4a' and in the lines of the effluent circuit may be led from the discharge end 9' of the membrane filter 4' via a line 56' into the line 43' and, correspondingly, from the inlet end 6a' of the membrane filter 4a' via a line 41' into the line 43' in which the impurities in the effluent are filtered by the purification device 120'. The effluent in the membrane filter 4a' may be alternatively or additionally removed from the discharge end 9a' along lines 57' and 58' into the line 43' when a valve 59' is open. A valve 44' of the line 43' and the valve 59' of the line 58' are normally when effluent is circulated in the effluent circuit 3' closed, but the valve 44' and, if desired, also the valve 59' are opened when effluent is to be removed from the effluent circuit or when the purification device 22' is to be used for cleaning the effluent circuit and its membrane filters 4', 4a' of the effluent and solid impurities. If the effluent coming via the line 43' cannot be purified by the purification device 120' well enough for the water to be purified to be discharged into the sea, the effluent is conveyed from the purification device 120' via the line 137' back to the effluent circuit 3' to be further purified. Preferably, the line 137' is provided with a balancing reservoir 138' in order to prevent the purification capacity of the effluent circuit 3' from being exceeded. The effluent becomes purified in the effluent circuit 3' and may be discharged, pure, into the sea at point P1' or, if the purified effluent of the effluent circuit 3' is led again to the purification device 120', at point P1a'.

Instead of purified water obtained from the line 32', pressurized air or some other appropriate fluid, such as nitrogen, may be used for cleaning the effluent circuit 3'. The volume of the effluent circuit 3' is e.g. 100 to 1000 L, typically 50 to 500 L. The volume depends on the engine power of the ship and the efficiency of the purification unit 2'. For a heavy oil operated diesel engine of about 6000 kW power, for instance, the volume of the effluent circuit is about 60 L.

The described backwashing and the related cleaning of the membrane filters 4', 4a' and emptying of the effluent circuit of effluent are carried out at intervals as necessary when the pressure difference so requires. Backwashing procedures may be carried out e.g. four times per hour. Among other factors, the impurity concentration and feed rate (in unit $m^3/h$) of the effluent flowing in the line 30', the volume of the effluent circuit 3', the efficiency and number of membrane filters 4', 4a', the purity requirement set for the water exiting from the line 32' have an influence on how often backwashing is to be performed. It is feasible that in association with the cleaning of the membranes 7', 7a' they are subjected to ultrasounds at a frequency of 30 to 70 kHz, e.g. 50 kHz, and/or to vibration at a frequency of 50 to 1000 Hz in order to enhance the cleaning thereof.

It is feasible that the effluent circuit 3' is cleaned such that it is not emptied completely. In such a case, only smaller amounts of effluent are removed from the effluent circuit at a time. A need to frequently remove small amounts of effluent arises if the semipermeable membranes 7', 7a' of the membrane filters clog up quickly with extremely small impurities that hinder the operation of the membrane filter. If small amounts of effluent are frequently removed from the effluent circuit 3', the total amount of exiting effluent is larger than if substantially all effluent, highly concentrated with impurities, is removed from the effluent circuit 3' at long intervals. In order to keep the total amount of effluent exiting from the effluent circuit 3' small, the effluent circuit and the semipermeable membranes 7', 7a' are cleaned only when necessary, i.e. when they no longer operate appropriately. If the need to clean the semipermeable membranes 7', 7a' is small, at least a vast majority of the effluent contained in the effluent circuit 3' is removed at long intervals, rather than only in small amounts and at short intervals.

In addition to the above-described cleaning comprising backwashing, it is preferable to clean the effluent circuit 3' with a cleaning agent, which may be a basic cleaning agent. Cleaning with a cleaning agent cleans the effluent circuit 3' more efficiently than a mere backwashing. The cleaning with a cleaning agent is performed much more seldom than the above-described backwashing procedures. In FIG. 1, reference number 72' designates a cleaning agent reservoir connected to the effluent circuit. The volume of the cleaning agent reservoir 72' is e.g. 100 L. The cleaning agent reservoir is connected to the line 30', in which case a cleaning agent is applied to a "dirty side" of the membrane filters. A need to clean the effluent circuit 3' arises when the pressure in the effluent circuit 3' rises above a certain level. Consequently, the pressure of the effluent circuit 3' is monitored by a measuring device 73'. When the measuring device 73' indicates that the pressure has risen above a certain level, a cleaning agent is fed from the cleaning reservoir 72' to the effluent circuit 3'. Alternatively, the effluent circuit 3' may be cleaned at certain determined intervals, in which case no measuring device 73' is necessary. Since those skilled in the art know how to design the necessary feeding arrangements, no arrangement for feeding a cleaning agent to the effluent circuit is explained in closer detail herein. Prior to feeding the cleaning agent to the effluent circuit 3', it is preferable to empty the effluent circuit of effluent.

The purification unit 2' also purifies polycyclic aromatic hydrocarbons (PAH). Preferably, the operation of the purification unit 2' is designed and dimensioned such that the PAH concentration of the purified effluent is not more than 50 µg/L above the PAH concentration of the water taken in, whereby said value 50 µg/L relates to a 45 t/MWh effluent rate, where MW refers to driving a combustion engine at a power which is 80% of the maximum power of the combustion engine. Reference number 45b' designates a measuring device for determining the PAH concentration in the purified effluent, i.e. in the line 32', while reference number 45a' designates a measuring device for determining the PAH concentration in the line 30' prior to the purification unit 2' and the effluent circuit 3'. The measuring devices 45a', 45b' are measuring devices based on fluorescence when the effluent rate exceeds 2.5 t/MWh, and measuring devices based on ultraviolet light or the like when the effluent rate is below 2.5 t/MWh. Preferably, the measuring devices should be in accordance with the ISO 7027:1999 standard.

Many metals contained in the effluent, such as arsenic, cadmium, chrome, copper, lead, nickel, zinc, vanadium, molybdenum and manganese, are detrimental to the environment. The purification unit 2' enables solid compounds containing said metals, i.e. particles, to be removed from the effluent such that the filtrate exiting from the line 32' does not contain them. The metal compounds dissolved in the effluent that are not purified in the membrane filters 4', 4a' may be removed from the purified effluent exiting from the membrane filters by ion exchange. The purified effluent is then led to an ion exchange apparatus, which is illustrated by reference number 66'. The ion exchange apparatus comprises one or more ion exchange pastes or resins to remove dissolved metal ions. Ion exchange occurs when the water being treated passes through the ion exchange paste or resin. Ion exchange pastes or resins suitable for removal of metal cations are highly acidic cation resins and chelating cation resins, for example. The ion exchange paste or resin used may be regenerated or replaced when necessary. The ion exchange apparatus 66 enables matter that cannot be reached by a nanofilter, such as metal ions, nitrates and nitrites, to be purified.

The purification unit 2' is designed to purify nitrates ($NO_3^-$) contained in the effluent so that the amount of nitrates does not exceed an amount $NO_X$ in exhaust gases associated with a 12% reduction of the amount $NO_X$ in the exhaust gases, or does not exceed 60 mg/L when the rate of effluent removal is 45 t/MWh, where the greater one of said conditions is the determining one. Nitrites ($NO_2^-$) contained in the effluent are also purified.

Typically, the sulphur compounds contained in the effluent are in sulphate form ($SO_4^{2-}$) so, being harmless, they may be discharged into the sea water and need not be purified. Nevertheless, the may be removed in the purification unit 2'. The effluent also contains a small amount of sulphites ($SO_3^{2-}$).

It is known that the above-described arrangement enables the exhaust gases from a ship's engine to be purified so that the sulphur and nitrogen compounds remain below the given maximum values. The scrubbing of exhaust gases produces wash water whose pH, PAH and composition may be as follows:
 pH 7.1
 PAH 22 µg/L
 water <75 wt %
 sulphates ($SO_4^{2-}$) <25 wt %
 nitrates ($NO_3^-$) <0.2 wt %
 nitrites ($NO_2^-$) <0.2 wt %
 metals, in total <0.0001 wt % (e.g. 65500 µg/L V, 8000 µg/L Ni, 1100 µg/L Mo, 240 µg/L Zn, 137 µg/L Cr, 130 µg/L Cu, 95 µg/L Mg, 58 µg/L AS, 2 µg/L Pb, 1 µg/L Cd, and Hg <0.2 µg/L)
 hydrocarbons, in total <0.0001 wt %.

The composition depends on the engine's running conditions, the fuel used, and the running conditions of the exhaust gas scrubber (the type, amount and temperature of the water).

A person skilled in the art will appreciate that nitrates can be purified in the purification unit 2' well enough for the aforementioned requirement to be met, according to which the amount of nitrates does not exceed the amount $NO_X$ in the exhaust gases associated with a 12% reduction of the $NO_X$ amount in the exhaust gases, or does not exceed 60 mg/L when the rate of effluent removal is 45 t/MWh, where the greater one of said conditions is the determining one. Sulphates can also be purified, although they could be discharged into the sea without purification. Nitrites are also purified. The purifying unit 2' onboard a ship ensures that both solid and dissolved metal compounds are purified.

FIGS. 5a and 5b show a third embodiment of the invention. FIG. 5b shows a purification unit 2" to be connected to a ship 10" shown in FIG. 5a such that when connected to the ship the purification unit is located onboard the ship. The reference numbers of the components in FIGS. 5a and 5b roughly correspond with those in FIGS. 1 and 4 when the function of the components in the invention is the same or almost the same. The embodiment of FIGS. 5a and 5b differs from the embodiment of FIG. 4 inter alia such that it comprises a tank 107" arranged between an exhaust gas scrubber 1" and an effluent circuit 3" and connected to a sludge receptacle 68a". The sludge receptacle 68a" may be called a backwashing tank. From the sludge receptacle 68a" sludge may be led via a purification device 120" to a sludge tank 68". The purification device 120" is shown in FIGS. 2 and 3, i.e. it is similar to the purification device used in the embodiments of FIGS. 1 and 4. The purification device 120" is arranged to filter sludge pumped from the sludge reservoir 68a". The filtration, which is carried out by using a precipitating agent as in the embodiments of FIGS. 1 and 4, yields a precipitate highly concentrated with impurities. The precipitate is led to the sludge tank 68" whose contents are ashore transferred to a waste treatment plant. The embodiment of FIGS. 5a and 5b further comprises a tank 113" arranged downstream of the exhaust gas scrubber 1" for receiving polluted wash water exiting from the exhaust gas scrubber. The tank 113" communicates with the ship's technical water, and water purified by the purification unit 2" may be fed thereto. A line (not shown) may be arranged for leading the purified effluent from a line 49" to a line 15" in a manner similar to that shown above in the embodiments of FIGS. 1 and 4. The line 49" may be provided with a valve arrangement (not shown) to enable the feeding of purified water to be controlled alternatively to the exhaust gas scrubber 1" (via the aforementioned line not shown and the line 15") or to the tank 113", or to both the exhaust gas scrubber 1" and the tank 113" simultaneously. Reference number 114" designates a pump for feeding, when necessary, sea water to the purified effluent exiting from the ship 10". When necessary, the pump 114" is used for diluting the purified effluent prior to discharging it into sea water.

In the embodiment of FIGS. 5a and 5b, the residue originating from the effluent circuit 3" and/or the liquid generated from the cleaning of the effluent circuit 3" and containing solid impurities is/are led when necessary (as in the embodiment of FIG. 4) after the purification taking place in the purification device 120" back to the effluent circuit 3" via a line 137". Alternatively, it is feasible that this liquid to be purified is led to the sludge receptacle 68a", which may serve as a balancing reservoir, in which case no line 137" including its balancing reservoir 138" is necessary.

If the water is too turbid, water purified in the effluent circuit may be clarified in the embodiment of FIGS. 5a and 5b as in the embodiment of FIG. 4. Activated charcoal (and a precipitating agent) used in the clarification is added to the water before it is led to the purification device 120". For spatial reasons, no activated charcoal feeding device is shown in FIG. 5b but most appropriately it may be connected to the line 132" in a manner similar to that used for connecting a feeding device 116' to the line 132' in the embodiment of FIG. 4.

In the following, it will be explained how in the embodiment of FIGS. 5a and 5b the membranes 7", 7a" of the membrane filters 4", 4a" are cleaned with a chemical cleaning agent in order to clean them of impurities and how the membrane filters are subjected to intermediate washing. The pump 13" is stopped while the membranes 7", 7a" are being cleaned. Prior to cleaning the membranes 7", 7a", the dirty side of the membrane filters 4", 4a" is emptied of effluent. The emptying may be carried out with pressurized air or by a drainage pump 100" or by both the pressurized air and the drainage pump 100".

Emptying the Dirty Side of the Membrane Filters by Means of Pressurized Air

Pressurized air is applied from a pressurized air line 106" to the clean side of the membrane filters 4", 4a", whereby the air passes from the clean side of the membrane filters to their dirty side and the effluent is led to the sludge receptacle 68' by opening valves 101", 102", 109".

Emptying the Dirty Side of the Membrane Filters by Means of a Drainage Pump

The drainage pump 100" is used for sucking at the lowest point of the circulation, and the effluent is led to the sludge receptacle 68". For the emptying, the ventilation valve 103" provided at the upper part of the circulation must be opened.

Emptying the Dirty Side of the Membrane Filters by Means of Pressurized Air and a Drainage Pump The drainage pump 100" is used for sucking at the lowest point of the circulation, and the effluent is led to the sludge receptacle 68". For the emptying, the ventilation valve 103" provided at the upper part of the circulation must be opened.

Filling the Membrane Filters for Cleaning, and Cleaning with a Basic Cleaning Agent After the membrane filters 4", 4a" have been emptied, the filling of the membrane filters for cleaning is started. The ventilation valves 103", 110" of air venting lines to an expansion tank 104" are opened. The membrane filters 4", 4a" are filled with heated technical water supplied from a line 111", and simultaneously a basic cleaning agent is dispensed from a basic cleaning agent reservoir 72a" by means of a cleaning agent feed pump 108". Reference number 112" designates a heater. The membrane filters 4", 4a" are filled up when a level switch 105" connected with the expansion tank 104" indicates this. The cleaning is started by starting a circulation pump 5'.

Emptying and Intermediate Washing of the Membrane Filters

After cleaning, the membrane filters 4", 4a" are emptied as explained above, after which the membrane filters are filled and washed as explained above with the exception that no cleaning agent is used.

After the aforementioned treatment, the membrane filters 4", 4a" have been cleaned and the process for purifying the effluent coming from the exhaust gas scrubber may continue by starting the feed pump 13" and the circulation pump 5".

When necessary, the membrane filters 4", 4a" may also be cleaned with an acidic cleaning agent. The cleaning with an acidic cleaning agent is carried out as explained above, but instead of a basic cleaning agent an acidic cleaning agent obtained from an acidic cleaning agent reservoir 72b" is used. After the membrane filters 4", 4a" have been cleaned with the acidic cleaning agent, the membrane filters are emptied and subjected to intermediate washing as described above.

Preferably, the purification unit 2" according to the invention may be a transferrable container-like unit since such a structure is quite easy to connect to old, already existing ships as retrofitting. In FIG. 5a, reference identification K1" designates a connecting means K1" for connecting the purification unit 2" to an effluent pipe 30" coming from the ship's exhaust gas scrubber 1", and reference identification K2" designates a connecting means for connecting the purification unit to the ship's water distribution circuit. Reference identification K3" designates a connecting means for connecting the purification unit to a pressurized air circuit of the ship so as to enable pressurized air to be applied to a clean side of the membrane filters in order to clean the membrane filters. It is feasible that components designated by reference numbers 19", 21", 45" and 20" reside inside the container-like unit. Naturally, the purification unit 2" according to FIGS. 5a, 5b may also be arranged in a ship in a fixed manner.

By estimation, the purification unit comprising a band filter collects about 1 to 3 m$^3$ of sludge highly concentrated with impurities during a two-week use of the ship. Naturally, the amount of sludge is influenced by the ship's engine power, the sulphur content of the fuel and many other factors.

EXAMPLE

The method and purification unit according to the invention were used for treating effluent from an exhaust gas scrubber of a heavy oil operated diesel engine of about 6000 kW power. The treatment took place by using the embodiment of the invention according to FIG. 4. The turbidity, pH and composition of the effluent prior to purification were: Turbidity 87 FNU, pH 12, nitrates ($NO_3^-$) 5.0 mg/L, nitrites ($NO_2^-$) 5.3 mg/L, sulphates ($SO_4^{2-}$) 940 mg/L, sulphites ($SO_3^{2-}$)<20 mg/L, and PAH compounds 84 µg/L in total. The effluent was fed to the purification unit at about 1.5 m$^3$/h through a coarse filter with a pore size of 35 µm. The effluent circulated in the effluent circuit provided with two series-connected membrane filters with a pore size of 50 nm. The flow rate in the effluent circuit was about 6 m/s and the pressure was 3 bar. The turbidity, pH and composition of purified effluent removed from the line 32' was: Turbidity 1.6 FNU, pH 12, nitrates ($NO_3^-$) 4.8 mg/L, nitrites ($NO_2^-$) 5.1 mg/L, sulphates ($SO_4^{2-}$) 380 mg/L, sulphites ($SO_3^{2-}$)<10 mg/L, and PAH compounds 6.9 µg/L in total.

In summary, it can be stated that the above-described arrangement enables exhaust gases to be purified and wash water to be treated such that even strict requirements and recommendations are met, e.g. those set forth in the IMO resolution MEPC.184(59) ("GUIDELINES FOR EXHAUST GAS CLEANING SYSTEMS") issued in 2009.

As described above, the purification device 120, 120', 120" comprising a band filter may be used for purifying both the effluent from an exhaust gas scrubber directly (the embodiment of FIG. 1) or only after the effluent has been subjected to filtration in the effluent circuit comprising membrane filters (the embodiments of FIGS. 4 and 5a, 5b). In the latter embodiments, the purification device 120', 120" is arranged to purify an aqueous fluid containing impurities originating from the wash water exiting from the exhaust gas scrubber and containing impurities and to be purified, i.e. the effluent. As described above, the purification device 120', 120" may also be used for clarifying water purified in the effluent circuit 3', 3".

It is clear that the arrangement requires some experimenting and adjusting so as to make the operation of the purification device as desired and meet the requirements set.

In the following, a list is presented to explain the meaning of the reference numbers used in FIGS. 1 and 2:
- 1, 1', 1" exhaust gas scrubber
- 2, 2', 2" purification unit
- 3, 3', 3" effluent circuit
- 4, 4a, 4', 4a', 4", 4a" membrane filter (a filter containing a semipermeable membrane)
- 5, 5', 5" circulation pump
- 6, 6', 6" inlet end of the membrane filter 4, 4', 4"
- 6a, 6a', 6a" inlet end of the membrane filter 4, 4a', 4a"
- 7, 7', 7" semipermeable membrane
- 7a, 7a', 7a" semipermeable membrane
- 8, 8', 8" outlet of the membrane filter 4, 4', 4"
- 8a, 8a', 8a" outlet of the membrane filter 4a, 4a', 4a"
- 9, 9', 9" discharge end of the membrane filter 4', 4', 4"
- 9a, 9a', 9a" discharge end of the membrane filter 4a, 4a', 4a"
- 10, 10', 10" ship
- 11, 11', 11" heat exchanger
- 12, 12', 12" coarse filter
- 12a' micro filter
- 13, 13', 13" feed pump
- 14, 14', 14" cooling apparatus
- 15, 15', 15" line
- 16, 16', 16" base feeding means
- 17, 17', 17" measuring means for determining pH value of effluent exiting from the exhaust gas scrubber 1
- 18, 18', 18" control means for controlling the base feeding means 16, 16', 16"
- 19, 19', 19a', 19", 19a", 19b" measuring means for determining pH value of purified effluent
- 20, 20', 20a', 20", 20a" feeding device for feeding a base to purified effluent
- 21, 21', 21a', 21", 21a" measuring means for determining turbidity of purified water
- 22' backwashing system
- 23, 23', 23" exhaust gas entrance point
- 24, 24', 24" measuring device for measuring $CO_2$ value of exhaust gases
- 25, 26, 25', 26', 25", 26" water feeding point
- 27, 27', 27" discharge point of purified exhaust gases
- 28, 28', 28" measuring device for determining $SO_2$ value of exhaust gases
- 29, 29', 29" pump
- 30, 30', 30" line (effluent line)
- 31', 31" inlet end of the circulation pump 5', 5"
- 32, 32', 32b', 32", 32b" line
- 35, 40, 33' to 40' return valves
- 43, 41', 42', 43' line
- 44' valve
- 45a, 45b, 45a', 45b', 45a", 45b" measuring device for determining PAH concentration
- 46, 46', 46" diesel engine
- 47, 47', 47" catalyser
- 48, 48', 48" exhaust gas boiler
- 49, 49', 49" line (outlet line)
- 50, 50', 50" pump
- 51, 52, 51', 52' return valve
- 53', 54', 53", 54" valve
- 55, 55', 55" water feeding point
- 56, 56', 57, 57', 58', 56", 57", 58" line
- 59' valve
- 60', 60" line
- 61', 61" water tank
- 62', 62" pump
- 63', 64', 63", 64" valve
- 65' heating device
- 66, 66', 66" ion exchange apparatus
- 67" line
- 68, 68', 68", 68a" sludge receptacle
- 69" line
- 70" valve
- 71" valve
- 72', 72a", 72b" cleaning agent reservoir
- 73', 73" measuring device
- 100" drainage pump
- 101", 102" valve
- 103" ventilation valve
- 104" expansion tank
- 105" level switch
- 106" pressurized air line
- 107" tank
- 108" feed pump
- 109' valve
- 110" ventilation valve
- 111" line
- 112" heater
- 113" tank
- 114" pump
- 115, 115a', 115a" three-way valve
- 116, 116' activated charcoal feeding device
- 117 three-way valve
- 118, 118', 118" roll
- 119, 119', 119" mixing vessel
- 120, 120', 120" purification device
- 121, 121', 121" band filter
- 122, 122', 122" filter band
- 123, 123', 123" underpressure means
- 124, 124', 124" scraper
- 125, 125', 125" space
- 126, 126', 126" spraying devices
- 127, 127', 127" motor-driven mixer
- 128, 128', 128" vessel
- 129, 129', 129" spreading box
- 130, 130', 130" float
- 131, 131', 131" filter
- 132, 132', 133', 132", 133" line
- 134', 135', 134", 135" return valve
- 136', 136" three-way valve
- 137', 137" line
- 138, 138" balancing reservoir
- K1", K2", K3" connecting means
- P1, P1', P1a', P1", P1a".

For the sake of simplicity, the figures do not show all components that according to the knowledge of those skilled in the art are necessary, for instance valves, such as return valves.

The invention has been disclosed above by means of a preferred embodiment only, and therefore it is to be noted that the details of the invention may be implemented in many different ways within the scope of the accompanying independent claims. Thus, for instance, the filter band of the purification device (120, 120', 120") does not have to be an endless filter band but it is feasible that it is a disposable filter band, in which case unused filter band is transferred from a feed roller to a receiving roller receiving used filter band containing impurities when the filter band is moving while carrying out the filtration. The disposable filter band is made of fibre mat which is from below supported by a porous metal plate. When the fibre mat is moving, it is arranged to slide on the metal plate, which is stationary. It is presumable that the pore size of the disposable fibre mat may in practice be smaller than the pore size of an endless steel band mesh. The pore size of the fibre mat is 30 to 60 µm, but may be as small as 20 to 30 µm, or even within a range of 10 to 20 µm. Naturally, the pore size of the fibre mat may be more than 60 µm. The disposable fibre mat is cleaned by a scraper, as is an endless filter band as well. The most appropriate pore size for a particular purpose is found by experimenting. A great advantage of an endless filter band over a disposable filter band is that the filter band does not have to be replaced. It is not necessary to subject the filter band (122, 122', 122") of the purification device to underpressure, but underpressure makes the operation of the purification device quicker and, owing to underpressure, the precipitate to be removed from the filter band is quite solid and thus takes only little space in the sludge receptacle (68, 68', 68"). In embodiments of the invention that are provided with an effluent circuit, the number of membrane filters containing a semipermeable membrane may vary. It is also feasible that the membrane filters are connected in parallel, as distinct from being connected in series as shown in the figure. Preferably, a plurality of effluent circuits and membrane filters may be provided, the effluent circuits being grouped such that at least one effluent circuit and/or at least one membrane filter therein is in use when at least one other effluent circuit and/or at least one membrane filter therein is being cleaned of effluent and/or impurities. This enables the purification unit to operate uninterruptedly while being cleaned. Instead of a feed pump (13, 13', 13") it is at least in principle feasible that the wash water to be purified is fed to the purification device (120, 120', 120") or to the effluent circuit by means of gravity. Prior to being led to the effluent circuit, the effluent may be filtered by means of one or more filters (cf. filters 12 and 12*a*).

The invention claimed is:

1. A method for treating impurities contained in exhaust gases of ships in order to reduce sulphur oxide emissions, the method comprising:
   scrubbing with water the exhaust gases in an exhaust gas scrubber in order to reduce sulphur dioxide emissions of the exhaust gases,
   supplying wash water to be purified, i.e. effluent, containing impurities and exiting from the exhaust gas scrubber, to a purification unit onboard a ship, in which the effluent is purified, the purification unit comprising a purification device comprising a band filter comprising a moving inclined filter band,
   monitoring a pH value of the purified effluent, and if the pH value is less than a predetermined value, the pH value of the effluent is adjusted to a desired value, after which the purified effluent is discharged into a sea or returned to the exhaust gas scrubber,
   feeding an aqueous fluid containing impurities originating from the effluent together with one or more precipitating agents to a first surface of the inclined filter band of the band filter and filtering said aqueous fluid through the filter band in order to concentrate impurities contained in the aqueous fluid onto the first surface of the band filter as a precipitate to be removed from the first surface of the filter band, and
   purifying the wash water to be purified, i.e., the effluent, exiting from the exhaust gas scrubber and containing impurities, in an effluent circuit included in the purification unit prior to said feeding of the aqueous fluid to the inclined filter band of the band filter, the effluent circuit including at least one membrane filter, and circulating the wash water to be purified, i.e. the effluent, in the effluent circuit in which the effluent is filtered using a semipermeable membrane of the membrane filter in order to achieve a purified effluent and a residue containing impurities, and removing the purified effluent from the membrane filter and from circulation in the effluent circuit while the residue keeps circulating in the effluent circuit in which it concentrates, and thereafter feeding at least some of the concentrated residue in the effluent circuit, highly concentrated with impurities and in the form of an aqueous fluid, to the inclined filter band of the band filter.

2. The method as claimed in claim 1, further comprising removing the precipitate from the first surface of the filter band by scraping.

3. A method as claimed in claim 1, further comprising discharging a filtrate passed through the filter band and containing purified water originating from the aqueous fluid into the sea or leading it to the exhaust gas scrubber.

4. The method as claimed in claim 1, further comprising cleaning at intervals the membrane filter of impurities by subjecting the membrane filter to backwashing of the semipermeable membrane of the membrane filter with a fluid free of impurities and in a flow direction opposite to the flow direction of the purified effluent flowing through the membrane filter, whereby the impurities collected in the membrane filter are removed from the membrane filter, and thereafter conveying the impurities, together with the fluid, out of the effluent circuit and filtering the impurities in the band filter of the purification device.

5. The method as claimed in claim 1, further comprising conveying the filtrate exiting from the purification device back to the effluent circuit for purifying the filtrate further in the effluent circuit prior to discharging the filtrate into the sea or conveying the filtrate to the exhaust gas scrubber.

6. A ship, comprising:
   an exhaust gas scrubber to scrub exhaust gases from the ship's combustion engine and to reduce sulphur dioxide emissions,
   a purification unit adapted to purify wash water to be purified, i.e. effluent, and exiting from the exhaust gas scrubber, wherein the purification unit comprises a purification device comprising a band filter comprising a moving inclined filter band adapted to purify impurities originating from the effluent,
   an effluent circuit comprising a circulation pump and at least one membrane filter comprising a semipermeable membrane, the circulation pump being arranged to circulate the effluent to be purified in the effluent circuit by feeding the effluent to an inlet end of the membrane filter such that the effluent flowing through the membrane filter filters through the semipermeable membrane and exits, purified, from an outlet of the membrane filter and from the effluent circuit while a residue containing impurities is led from a discharge end of the membrane filter back to the circulation pump and from the circulation pump again to the inlet end of the membrane filter, the purification device being connected downstream of the discharge end of the membrane filter and arranged to receive from the effluent circuit a residue highly concentrated with impurities in the form of an aqueous fluid in order to further concentrate this into a precipitate.

7. The ship as claimed in claim 6, further comprising a feeder comprising a pump and a valve, the feeder being adapted to feed one or more precipitating agents to the purification device.

8. The ship as claimed in claim 6, wherein the filter band of the band filter is an endless filter band defining a space for receiving a filtrate.

9. The ship as claimed in claim 6, further comprising a suction device configured to produce underpressure on a clean side of the filter band.

10. The ship as claimed in claim 6, further comprising a scraper is provided in connection with the band filter for removing the precipitate by scraping from a first surface of the filter band in order to clean the filter band.

11. The ship as claimed in claim 8, wherein the purification device comprises spraying devices arranged in said space for spraying water to a second surface of the filter band in order to remove impurities from a first surface of the filter band, the second surface of the filter band being opposite to the first surface of the filter band.

12. The ship as claimed in claim 6, further comprising a line for conveying the filtrate exiting from the purification device back to the effluent circuit for further purifying the filtrate.

13. The ship as claimed in claim 6, wherein the purification unit comprises a coarse filter arranged upstream of the effluent circuit.

14. The ship as claimed in claim 6, further comprising a backwashing system for cleaning the semipermeable membrane of the membrane filter of impurity particles, the backwashing system being arranged to feed a fluid free of impurities in a flow direction of the semipermeable membrane of the membrane filter, which is opposite to the flow direction of the purified effluent.

15. The ship as claimed in claim 6, further comprising a line for feeding the purified effluent back to the exhaust gas scrubber.

16. A purification unit for purifying wash water, i.e. effluent, polluted with impurities and exiting from an exhaust gas scrubber of a ship, wherein the purification unit is a transferrable container-like unit comprising:

a first connector configured for connecting the purification unit to an effluent line coming from the exhaust gas scrubber of the ship, a second connector configured for connecting the purification unit to a water distribution circuit of the ship, an outlet line for discharging from the purification unit the effluent purified therein, a purification device comprising a band filter comprising a moving inclined filter band in order to concentrate impurities originating from the effluent onto a first surface of the filter band as a precipitate, and an effluent circuit comprising a circulation pump and at least one membrane filter comprising a semipermeable membrane, the circulation pump being arranged to circulate the effluent to be purified in the effluent circuit by feeding the effluent to an inlet end of the membrane filter such that the effluent flowing through the membrane filter filters through the semipermeable membrane and exits, purified, from an outlet of the membrane filter and from the effluent circuit while a residue containing impurities is led from a discharge end of the membrane filter back to the circulation pump and from the circulation pump again to the inlet end of the membrane filter, the purification device being connected downstream of the discharge end of the membrane filter and arranged to receive from the effluent circuit a residue highly concentrated with impurities in the form of an aqueous fluid in order to further concentrate this into a precipitate.

17. The purification unit as claimed in claim 16, further comprising a line for conveying the filtrate exiting from the purification device back to the effluent circuit for further purifying the filtrate.

* * * * *